United States Patent
Qu et al.

(10) Patent No.: US 10,136,162 B2
(45) Date of Patent: Nov. 20, 2018

(54) SPECIFYING VISUAL DYNAMIC RANGE CODING OPERATIONS AND PARAMETERS

(71) Applicant: DOLBY LABORATORIES LICENSING CORPORATION, San Francisco, CA (US)

(72) Inventors: Sheng Qu, San Jose, CA (US); Peng Yin, Ithaca, NY (US); Yan Ye, San Diego, CA (US); Yuwen He, San Diego, CA (US); Walter Gish, Oak Park, CA (US); Guan-Ming Su, Fremont, CA (US); Yufei Yuan, Austin, TX (US); Samir Hulyalkar, Los Gatos, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 377 days.

(21) Appl. No.: 14/364,979

(22) PCT Filed: Dec. 18, 2012

(86) PCT No.: PCT/US2012/070397
§ 371 (c)(1),
(2) Date: Jun. 12, 2014

(87) PCT Pub. No.: WO2013/103522
PCT Pub. Date: Jul. 11, 2013

(65) Prior Publication Data
US 2014/0341305 A1    Nov. 20, 2014

Related U.S. Application Data

(60) Provisional application No. 61/582,614, filed on Jan. 3, 2012.

(51) Int. Cl.
*H04N 7/50*     (2006.01)
*H04N 21/2365*  (2011.01)
(Continued)

(52) U.S. Cl.
CPC ............. *H04N 19/70* (2014.11); *H04L 69/22* (2013.01); *H04N 19/159* (2014.11);
(Continued)

(58) Field of Classification Search
CPC ............................. H04N 13/48; H04N 19/70
See application file for complete search history.

(56) References Cited

U.S. PATENT DOCUMENTS 7,826,673 B2   11/2010  Segall
8,514,934 B2    8/2013  Ward
(Continued)

FOREIGN PATENT DOCUMENTS

JP   2006-135521   5/2006
JP   2009-027663   2/2009
(Continued)

OTHER PUBLICATIONS

Dolby's Frame Compatible Full Resolution (FCFR) 3D System Specifications. Dolby Laboratories Inc. Dec. 2010.
(Continued)

*Primary Examiner* — Jeremaiah C Hallenbeck-Huber
*Assistant Examiner* — Amir Shahnami

(57) ABSTRACT

Coding syntaxes in compliance with same or different VDR specifications may be signaled by upstream coding devices such as VDR encoders to downstream coding devices such as VDR decoders in a common vehicle in the form of RPU data units. VDR coding operations and operational parameters may be specified as sequence level, frame level, or partition level syntax elements in a coding syntax. Syntax elements in a coding syntax may be coded directly in one or more current RPU data units under a current RPU ID, predicted from other partitions/segments/ranges previously sent with the same current RPU ID, or predicted from other frame level or sequence level syntax elements previously (Continued)

sent with a previous RPU ID. A downstream device may perform decoding operations on multi-layered input image data based on received coding syntaxes to construct VDR images.

24 Claims, 10 Drawing Sheets

(51) Int. Cl.
| | | |
|---|---|---|
| H04N 19/70 | (2014.01) | |
| H04N 19/30 | (2014.01) | |
| H04N 19/159 | (2014.01) | |
| H04N 19/50 | (2014.01) | |
| H04N 19/597 | (2014.01) | |
| H04N 19/98 | (2014.01) | |
| H04L 29/06 | (2006.01) | |

(52) U.S. Cl.
CPC ............. *H04N 19/30* (2014.11); *H04N 19/50* (2014.11); *H04N 19/597* (2014.11); *H04N 19/98* (2014.11)

(56) References Cited

U.S. PATENT DOCUMENTS

| | | | |
|---|---|---|---|
| 2005/0259729 A1* | 11/2005 | Sun | H04N 19/33 375/240.1 |
| 2007/0201560 A1 | 8/2007 | Segall | |
| 2008/0175495 A1 | 7/2008 | Segall | |
| 2009/0003437 A1 | 1/2009 | Cho | |
| 2009/0046207 A1 | 2/2009 | Salvucci | |
| 2009/0074060 A1 | 3/2009 | Kim | |
| 2009/0110054 A1 | 4/2009 | Kim | |
| 2009/0129474 A1* | 5/2009 | Pandit | H04N 19/00721 375/240.16 |
| 2009/0196517 A1 | 8/2009 | Divorra Escoda | |
| 2009/0285283 A1 | 11/2009 | Gao | |
| 2009/0296808 A1* | 12/2009 | Regunathan | H04N 19/197 375/240.03 |
| 2010/0046612 A1 | 2/2010 | Sun | |
| 2010/0091840 A1* | 4/2010 | Gao | H04N 19/105 375/240.2 |
| 2010/0128786 A1* | 5/2010 | Gao | H04N 19/147 375/240.13 |
| 2010/0153395 A1* | 6/2010 | Hannuksela | G11B 27/102 707/737 |
| 2010/0189182 A1 | 7/2010 | Hannuksela | |
| 2010/0208810 A1* | 8/2010 | Yin | H04N 19/105 375/240.12 |
| 2011/0090959 A1* | 4/2011 | Wiegand | H04N 19/593 375/240.12 |
| 2011/0194618 A1* | 8/2011 | Gish | G06T 5/50 375/240.25 |
| 2011/0228855 A1* | 9/2011 | Gao | H04N 19/70 375/240.18 |
| 2011/0249725 A1 | 10/2011 | Auyeung | |
| 2013/0148029 A1 | 6/2013 | Gish | |

FOREIGN PATENT DOCUMENTS

| | | |
|---|---|---|
| JP | 2010-507941 | 3/2010 |
| JP | 2012-517764 | 8/2012 |
| TW | 200843513 | 11/2008 |
| TW | 200915228 | 4/2009 |
| WO | 2008/077273 | 7/2008 |
| WO | 2008/083521 | 7/2008 |
| WO | 2009/051692 | 4/2009 |
| WO | 2011/163629 | 12/2011 |

OTHER PUBLICATIONS

ITU-T and ISO/IEC JTC 1, "Advanced Video Coding for Generic Audiovisual Services" ITU-T Recommendation H.264 and ISO/IEC 14496-10, 2009.

JVT Reference software Version H.264, Karsten Suhring, HHI.

Husak, Walt "Frame Compatible Delivery of Broadcast Content" MPEG Meeting, Jul. 2010, Motion Picture Expert Group or ISO/IEC JTC1/SC29/WG11.

Tourapis, A. et al. "System Specification and Software of a Frame Compatible Full Resolution 3D Video Coding System", MPEG Meeting, Jul. 2010, Motion Picture Expert Group or ISO/IEC JTC1/SC29/WG11.

Liu, S. et al "Bit-Depth Scalable Coding for High Dynamic Range Video" Proc. of SPIE, Jan. 28, 2008, pp. 682200-1-682200-10, vol. 6822.

Segall, A. et al "Tone Mapping SEI Message" JVT of ISO/IEC MPEG & ITU-T VCEG, 19th Meeting: Geneva, Switzerland, Apr. 1-10, 2006.

Ninken, M. et al "CE2: SVC Bit-Depth Scalable Coding" JVT of ISO/IEC MPEG & ITU-T VCEG, 24th Meeting: Geneva, CH, Jun. 29-Jul. 5, 2007.

Segall, Andrew "Scalable Coding of High Dynamic Range Video" Proc. of IEEE International Conference on Image Processing, Oct. 1, 2007, pp. I-1 through I-4, vol. 1.

Chiang, Jui-Chiu, et al "Bit-depth Scalable Video Coding Using Inter-Layer Prediction from High Bit-Depth Layer" IEEE International Conference on Acoustics, Speech and Signal Processing, Apr. 19-24, 2009, pp. 649-652.

Gao, Y. et al "H.264/Advanced Video Coding (AVC) Backward-Compatible Bit-Depth Scalable Coding" IEEE Transactions on Circuits and Systems for Video Technology, vol. 19, No. 4, pp. 500-510, Apr. 2009.

* cited by examiner

SPECIFYING VISUAL DYNAMIC RANGE CODING OPERATIONS AND PARAMETERS

CROSS-REFERENCE TO RELATED APPLICATIONS

This application claims priority to U.S. Provisional Application No. 61/582,614, filed Jan. 3, 2012, the disclosure of which is hereby incorporated by reference in its entirety.

TECHNOLOGY

The present invention relates generally to video coding systems and more particularly to systems that encode, decode, and represent visual dynamic range images.

BACKGROUND

Display techniques have been developed to support transmitting and rendering video content based on specific video formats. For example, MPEG video encoders and decoders may support video content coded in a MPEG video format. Other video encoders and decoders may support video content coded in different video formats.

A consumer device such as a handheld device typically is installed or configured with a limited set of video coding systems each of which may support a specific video format in a limited set of video formats. Thus, if a piece of video content is not encoded and delivered in an expected video format, the device will likely be incapable of finding a suitable video decoder to decode and help render the video content. Even rendered, the rendered video content may comprise incorrect interpretation or representation of the received video content, and produce visible artifacts in colors and luminance values.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
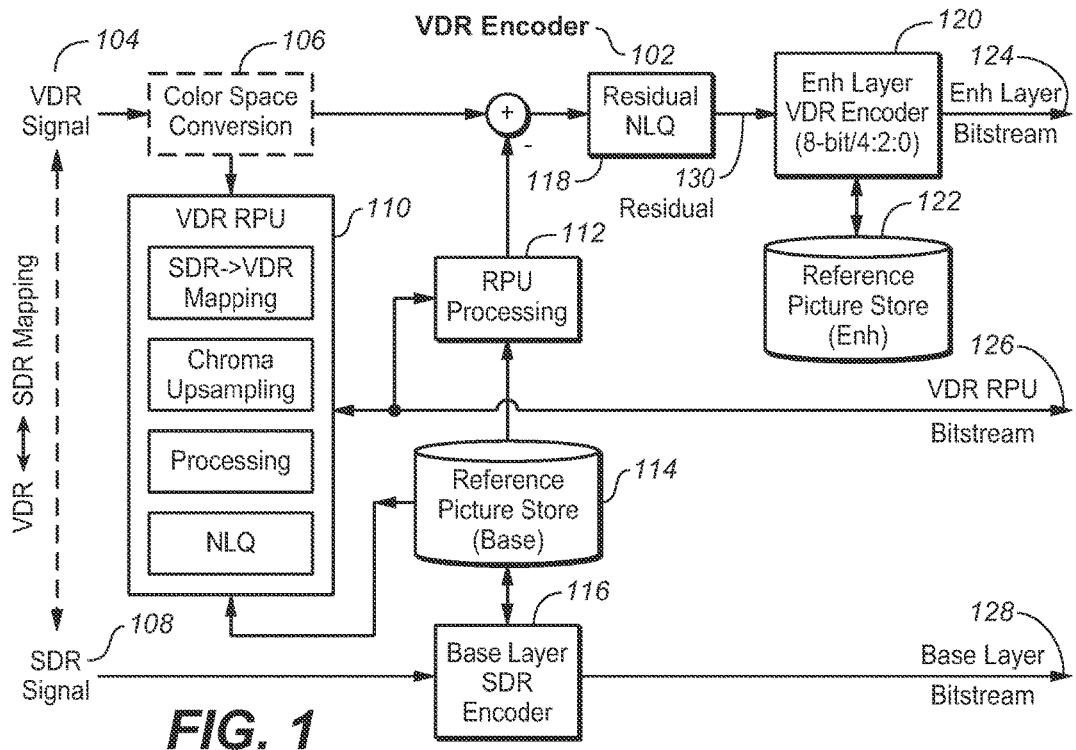
FIG. 1 and FIG. 2 illustrate visual dynamic range (VDR) encoders that generate Reference Processing Unit (RPU) data based on a coding syntax in compliance with one or more VDR specifications, in example embodiments.

Example embodiments, which relate to encoding, decoding, and representing visual dynamic range images using a hierarchical VDR codec, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. VDR ENCODERS
3. RPU DATA UNITS
4. RPU DATA DECODING—SEQUENCE LEVEL AND/OR FRAME LEVEL
5. RPU DATA DECODING—PARTITION LEVEL
6. RPU DATA DECODING—CHROMA MAPPING
7. ADDITIONAL EXAMPLES OF RPU DATA DECODING
8. EXAMPLE PROCESS FLOWS
9. IMPLEMENTATION MECHANISMS—HARDWARE OVERVIEW
10. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below.

Techniques as described herein support transferring and signaling reference processing data generated by different video coding systems to downstream devices in a common vehicle. As used herein, the term "common vehicle" may refer to a common reference processing unit (RPU) data format that is configured to carry reference processing data generated based on any one of a wide variety of visual dynamic range (VDR) specifications. As used herein, reference processing data carried in the common vehicle provides a coding syntax comprising a plurality of syntax elements specifying operations and parameters used or to be used in encoding and decoding of video data associated with the reference processing data. Syntax elements as described herein are capable of describing operations that are common to some or all of the different VDR specifications or that are specific to only one or more but not all of the different VDR specifications. A common reference processing data decoding/parsing process may be implemented, for example, in a downstream (e.g., consumer) device, to decode a coding syntax, or syntax elements therein, no matter which VDR specification the coding syntax is pertain to. Thus, a downstream device does not need to implement an individual and distinct reference processing data decoding/parsing process for every existing or new VDR specification that the consumer device is or will be configured to support. A provider of downstream devices may only need to focus on providing support for algorithms and operations for encoding and decoding media samples as specified in an existing or new VDR specification. The same reference processing data decoding/parsing process may be reused or substantially reused for all VDR specifications including VDR specifications yet to be developed, because techniques as described herein use a common vehicle to deliver or signal reference processing data associated with media samples generated under differing VDR specifications. As used herein, the term "media samples" refer to data which, when combined with the reference processing data, form VDR data as described herein.

Multiple layers (or bitstreams) may be used to deliver VDR data (media samples and reference processing unit data) from an upstream device such as a VDR encoder to downstream devices. The VDR data carried in the multiple layers may be used to support a wide range of display technologies, which may include but not limited only to any of, backwards compatible display technologies and new high dynamic range (HDR) display technologies. As used herein, the term "VDR" or "visual dynamic range" may refer to a dynamic range wider than a standard dynamic range, and may include, but is not limited to, a wide dynamic range up to the instantaneously perceivable dynamic range and color gamut which human vision can perceive at an instant. As used herein, the term "multi-layer" or "multiple layers" may refer to two or more bitstreams comprising a base layer (BL), a reference processing unit (RPU) layer and enhancement layers (ELs) that carry multiple video or image signals having one or more logical dependency relationships between one another (of the video signals).

A base layer may carry BL data (base layer media samples) derived from a SDR signal or mapped from input VDR data in a VDR signal by an upstream device. One or more enhancement layers (ELs) may carry EL data (enhancement layer media samples) derived at least in part from the VDR signal by the upstream device. In some embodiments, to exploit statistical redundancy between the BL data and the EL data both of which are correlated to the same input VDR data, the EL data may be (redundancy) reduced to comprise residual values or differential values between predicted values based on the BL video data and the input VDR video data. In some embodiments, a VDR encoder may be configured to apply accurate prediction algorithms so that residual values are reduced to zero; hence, the EL data may be used to hold a reduced set of inter-layer reference pictures related to the accurate prediction algorithms instead of holding unhelpful zero residual values. An inter-layer reference picture for a residual free video coding system may be generated not for a single VDR image but rather for a group of correlated input VDR images.

In some embodiments, an RPU layer may carry reference processing data (alternatively denoted as RPU data) generated by the upstream device. An upstream device such as a VDR encoder may use RPU data to signal a coding syntax to a downstream device such as a VDR decoder. The coding syntax enables the VDR decoder to reconstruct VDR images based on the BL data and the EL data in the BL and EL layers.

Examples of syntax elements carried in the RPU data may include, but are not limited to any of, inter-layer prediction coefficients, residual non-linear dequantization parameters, chroma resampling filter coefficients, color space transform indicators and other VDR syntax elements (e.g., flags and descriptors of functions and/or operations performed by a VDR encoder to generate the BL and EL data and a VDR decoder to decode the BL and EL data). The syntax elements in the RPU data may be classified into one of sequence level, frame level, partition level, or function/operation level.

Input VDR media content (e.g., an HDR movie) may be subdivided into sequences (e.g., corresponding to scenes or a portion of a scene, etc.), frames (or images or pictures), or partitions (or portions of an image). Syntax elements at a sequence, frame or partition level may be explicitly coded in current RPU data, or predicted from previously sent RPU data at a corresponding sequence, frame or partition level. Additionally, optionally, or alternatively, a syntax element may appear at more than one of the sequence, frame and partition levels.

Techniques as described herein including layered codec architecture (BL, EL and RPU layers) may be implemented by different VDR coding systems. For example, a first VDR coding system that implements some of the techniques may be a residue based layered codec, in which both base layer and enhancement layer use a chroma format (e.g., 4:2:0) and a low bit depth (e.g., 8 bits); a second VDR coding system that implements some of the techniques may be a signal based layered codec, in which an enhancement layer uses wider chroma format (e.g., 4:4:4) and a higher bit depth (e.g., 12 bits or more) than a chroma format (e.g., 4:2:0) and a bit depth (8 bits) of a base layer (4:2:0 8 bits). In particular, RPU data decoding techniques as described herein may be implemented in a VDR coding system initially supporting a set of one or more different VDR specifications and may be reused with little or no change in the VDR coding system when additional VDR specifications are subsequently supported.

An RPU layer coded bitstream, or RPU data therein, may be synchronized with coded bitstreams in other layers, or BL and EL data therein. For example, synchronization of RPU data and BL/EL data may be through picture display number in display order (for example, picture_order_count as specified in H.264).

Techniques as described herein support a plurality of operations used in inter-layer prediction, inverse mapping, chroma resampling, data processing such as interpolation in border regions of partitions, spatial scaling, non-linear quantization, etc. Some supported operations may be common to some or all of different VDR specifications, while some other supported operations may be unique to one or more specific but not all VDR specifications. For example, non-linear quantization/dequantization may be performed for VDR specifications with residual values as EL data.

Techniques as described herein support video encoding and decoding as driven by a flexible coding syntax. This approach allows parallel and continuous optimization of encoder and decoder designs, for example, with improved algorithms, implementation costs, speeds, etc. The coding syntax along with layered VDR data may be efficiently transmitted and signaled by a VDR encoder to a VDR decoder by exploiting redundancy between current RPU data and previously sent RPU data. The coding syntax provides a roadmap (e.g., complete) for the VDR decoder to efficiently perform decoding operations, for example, in a reverse data flow.

In some example embodiments, mechanisms as described herein form a part of a media processing system, including but not limited to any of: a handheld device, game machine, television, laptop computer, netbook computer, tablet computer, cellular radiotelephone, electronic book reader, point of sale terminal, desktop computer, computer workstation, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. VDR Encoders

A VDR encoder may generate BL data, EL data and RPU data using a coding syntax in compliance with one of one or more different VDR specifications. These different VDR specifications may be labeled or identified with different versions comprising different combinations of major and/or minor version numbers (other ways of identifying specific VDR specifications may similarly be used). As used herein, a VDR specification may provide a specification of syntax elements that may be included in a coding syntax, which may be signaled from an upstream device such as a VDR encoder to a downstream device such as a VDR decoder.

FIG. 1 illustrates a VDR encoder 102 that generates RPU data based on a coding syntax in compliance with one or more VDR specifications. In some embodiments, at least two VDR specifications, for example, respectively labeled with a first version ("1.0") or a second version ("1.x"), are supported by the VDR encoder 102. The VDR encoder 102 may be configured to perform operations on the BL data, EL data, RPU data, inter-layer prediction data and intermediate media data in accordance with the coding syntax that complies with in the one or more VDR specifications supported by the VDR encoder 102. These different VDR specifications may include, but are not limited to, a first version that supports backwards compatibility and a second version that does not support backwards compatibility. As used herein, the term "backwards compatibility" refers to whether BL data comprises SDR images optimized for viewing on SDR displays. The VDR encoder 102 may be implemented with one or more computing devices.

In an embodiment, the VDR encoder 102 is configured to receive an (input) VDR signal 104 and derive an input VDR image from the VDR signal 104. As used herein, an "input VDR image" may comprise wide or high dynamic range image data for decoding a VDR version of a source image, which in turn may be a raw image captured by a high-end image acquisition device. The input VDR image may be a high bit depth (e.g., 10+ bit) image in an input color space that supports a high dynamic range color gamut. Examples of one or more VDR signals received or processed by a VDR coding system as described herein include, but are not limited to any of, 12-bit P3 D65 RGB 444 signals, 12-bit Recommendation (Rec.) 709 RGB 444 signals, 12-bit DCDM X'Y'Z' 444 signals, video data in a 16-bit TIFF file format, etc.

In an example, each pixel represented in the input VDR image comprises pixel values for all channels (e.g., red, green, and blue color channels) defined for a color space (e.g., a RGB color space). Each pixel may optionally and/or alternatively comprise upsampled or downsampled pixel values for one or more of the channels in the color space. It should be noted that in some embodiments, in addition to three primary colors such as red, green and blue, different primary colors may be concurrently used in a color space as described herein, for example, to support a wide color gamut; in those embodiments, image data as described herein includes additional pixel values for those different primary colors and may be concurrently processed by techniques as described herein.

In an embodiment, the VDR encoder 102 may perform inter-layer prediction related operations in a mapping color space (e.g., one of YCbCr space, RGB space, or another color space). In some embodiments, if the input color space is different from the mapping color space, then the input VDR image may be transformed from the input color space to the mapping color space by a color space conversion unit.

In an embodiment, the VDR encoder 102 is configured to receive an (input) SDR signal 108 and derive BL data from the SDR signal 108, as illustrated in FIG. 1. Examples of one or more SDR signals received by a VDR coding system as described herein include, but are not limited to any of, 8-bit YCbCr signals, video data in a 8-bit YUV file format, etc.

As used herein, "BL data" may refer to low bit depth (e.g., 8 bit) image data that may or may not be optimized for viewing on SDR displays. As used herein, the term "a low bit depth" refers to image data quantized in a coding space that is with a low bit depth; an example of low bit depth comprises 8 bits, while the term "a high bit depth" refers to image data quantized in a coding space that is with a high bit depth; an example of high bit depth is 10, 12 bits or more. In particular, the term "a low bit depth" or "a high bit depth" does not refer to least significant bits or most significant bits of a pixel value.

In a first example, the BL data comprises an SDR image optimized for viewing on SDR displays and may be associated with a VDR specification of the first version that supports backwards compatibility. The SDR image may comprise color-corrections by colorists to make the SDR image to look as realistic as possible within a relatively narrow or standard dynamic range. For example, hue information related to some or all of the pixels in a source HDR image that gives rise to the input VDR image may be changed or corrected in the SDR image in order to create a realistic looking image within the standard dynamic range.

In a second example, the VDR encoder 102 is configured to apply a VDR-SDR (e.g., tone) mapping to the input VDR image to derive the BL data, instead of deriving the BL data from an input SDR signal like 108 of FIG. 1. The BL data in this example may not be optimized for viewing on SDR displays, and may be associated with a VDR specification of the second version that does not support backwards compatibility. The BL data may comprise a low bit representation of the input VDR image. The VDR-SDR mapping may, for example, be based on one or more of global quantization, linear quantization, linear stretching, curve-based quantization, probability-density-function (Pdf) optimized quantization, LLoyd-Max quantization, partition-based quantization, perceptual quantization, cross-color channel/vector quantization, or other types of quantization. Additionally, optionally, or alternatively, the VDR-SDR mapping may, for example, include zero or more of de-noising processing, frame alignment processing, color grading processing, etc. The BL data in this example may not be optimized for presenting a realistic looking image within the standard dynamic range. Rather, the BL data may be meant to be efficiently combined with the EL data by a downstream device to construct an output VDR image corresponding to the input VDR image derived from the input VDR signal of FIG. 1.

In an embodiment, the VDR encoder 102, or a base layer SDR encoder (116) therein, is configured to encode the input SDR image, which may be derived from the SDR signal 108 or from mapping operations on the input VDR image derived from the VDR signal 104, into a base layer bitstream 128.

In an embodiment, the VDR encoder 102 adopts a hybrid video coding model such as H.264/MPEG-4 AVC (IS 14496-10), HEVC, MPEG-4 Part2(IS 14496-2), MPEG-2 (IS 11138-2), VP8, VC-1, and/or others. Media samples meant to be encoded in the base layer may be predicted either from neighboring samples in the same image (using intra prediction) or from samples from past decoded images (inter prediction) that belong to the same base layer. These decoded BL samples to be used for prediction may be stored or buffered within a reference picture store (for base layer) 114.

In an embodiment, the VDR encoder 102 is further configured to perform inter-layer prediction for media samples meant to be encoded in the enhancement layer based on the decoded BL samples. The decoded BL samples may be retrieved from the reference picture store 114 (which may be one or more of memory buffers or other forms of memory space).

The VDR encoder 102, or a VDR RPU 110 therein, may be configured to generate the coding syntax for encoding-related operations performed by the VDR encoder 102. These encoding-related operations include operations performed to generate the EL data to be transmitted in an enhancement layer bitstream 124. Under techniques as described herein, a coding syntax for encoding-related operations is signaled by a VDR encoder to a VDR decoder so that the VDR decoder uses the same coding syntax for decoding-related operations. In some embodiments, a coding syntax signaled by a VDR encoder to a VDR decoder may specify one or more additional operations that are to be solely performed by a VDR decoder but not by the VDR encoder. These additional operations include, but not limited to any of, display management operations.

The coding syntax may comprise a plurality of syntax elements in compliance with a specific VDR specification supported by the VDR encoder 102 and may include, but are not limited to any of, inter-layer prediction coefficients, residual non-linear dequantization parameters, chroma resampling filter coefficients, color space transform indicators, or other VDR syntax elements (e.g., flags and descriptors of functions and/or operations performed by a VDR encoder to generate the BL and EL data and VDR decoder to decode BL and EL data).

In an embodiment, an RPU processing module 112 is configured to perform a series of sequence level, frame level, and partition level operations (which may include but are not limited only to those related to prediction) based on the coding syntax. For example, the RPU processing module 112 may perform operations such as inverse mapping such as SDR-VDR mapping, chroma upsampling, one or more video data processing operations (e.g., filtering, interpolation, rescaling, etc.), or non-linear quantization (NLQ), as specified in the coding syntax. As a result, prediction reference values may be generated by the RPU processing module 112.

In an embodiment, the VDR encoder 102 may perform one or more operations to generate residual values (130) between VDR image data derived from the input VDR image—derived from the VDR signal 104 and color spaced transformed if necessary—and the prediction reference values. Residual values may be differences in a linear or logarithmic domain. In an embodiment, the VDR encoder 102, or a residual downsampling/resampling unit therein, may be configured to perform one or more downsampling/resampling operations on the residual values (130) to generate downsampled (e.g., 8-bit) residual values for further processing. In an embodiment, the VDR encoder 102, or a residual non-linear quantizer (NLQ; 118) therein, may be configured to perform one or more non-linear quantization operations on the residual values (130) or the downsampled residual values, and to provide the non-linearly quantized residual values to other units of the VDR encoder 102 for further processing.

In an embodiment, the VDR encoder 102, or an enhancement layer (for the purpose illustration only, 8 bit/4:2:0) encoder (120) therein, is configured to encode the residual values (which may be non-linearly quantized and/or downsampled in some embodiments) as the EL data into an enhancement layer bitstream 124.

In the embodiment in which the VDR encoder 102, or an enhancement layer (for the purpose illustration only, 8 bit/4:2:0) encoder (120) adopts a hybrid video coding model, the residual values may be predicted either from neighboring residual value samples in the same image (using intra prediction) or from residual value samples from past decoded images (inter prediction) that belong to the same enhancement layer. In an embodiment, same layer EL samples for prediction are stored or buffered within a reference picture store (for enhancement layer) 122.

In an embodiment, the VDR encoder 102, or the VDR RPU 110 therein, is configured to encode the coding syntax as a part of RPU data into a VDR RPU bitstream 126. The RPU data may include, but are not limited to any of, SDR-VDR mapping parameters, polynomial parameters used by a prediction method applied to generate the prediction reference image, NLQ parameters, parameters used by one or more video data processing operations performed by the VDR RPU (110). The VDR RPU 110 may set flags or header fields in RPU data units to indicate whether any syntax elements in the coding syntax may be predicted from RPU data previously sent for a prior sequence, a prior frame, or a prior partition.

One or both of the BL encoder (116) and the EL encoder (120), may be implemented using one or more of a plurality of codecs, such as H.264/MPEG-4 AVC, HEVC, MPEG-2, VP8, VC-1, and/or others.

A corresponding VDR decoder, which implements a reverse data flow to that illustrated in FIG. 1 and supports the same VDR specification with which the VDR encoder 102 generates the coding syntax, may be used to decode the BL, EL and RPU bitstreams generated by the VDR encoder 102 and generate a reconstructed version of the input VDR image.

Figure 2:
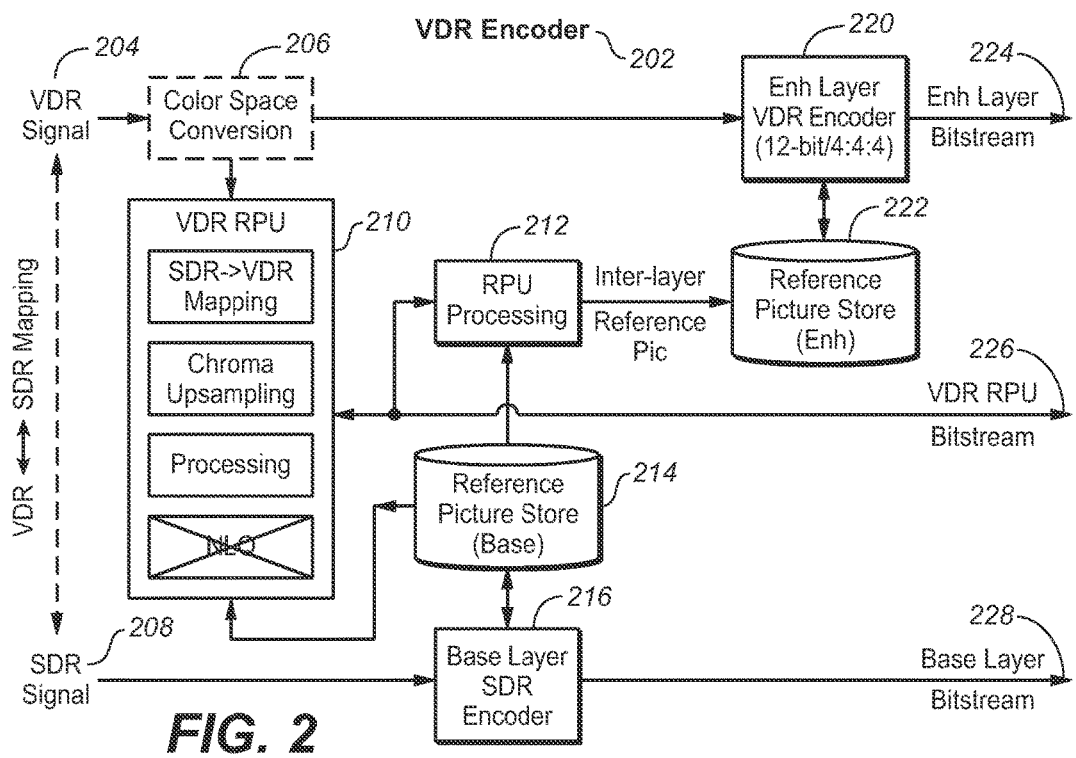

FIG. 2 illustrates a VDR encoder (202) that generates RPU data corresponding to one or more different VDR specifications. The VDR encoder 202 may, but is not limited to, be associated with a VDR specification of a third version (e.g., denoted as "2.0") that may be different from the first version or the second version implemented by the VDR encoder 102. The VDR encoder 202 may be implemented with one or more computing devices.

In an example embodiment, the VDR encoder 202 is configured to receive an (input) VDR signal 204 and derivean input VDR image from the VDR signal 204. The input VDR image may comprise high bit depth (e.g., 10+ bit) image data in an input color space that supports a high dynamic range color gamut.

In some embodiments, if the input color space is different from a mapping color space in which the VDR encoder 202 performs prediction operations, then the input VDR image may be transformed from the input color space to the mapping color space by a color space conversion unit.

In an embodiment, the VDR encoder 202 is configured to receive an (input) SDR signal 208 and derive BL data from the SDR signal 208, as illustrated in FIG. 2. Alternatively, the VDR encoder 202 is configured to apply VDR-SDR (e.g., tone) mapping to the input VDR image to derive the BL data, instead of decoding the BL data from a SDR signal. The BL data may comprise low bit depth (e.g., 8 bit) image data that may or may not be optimized for viewing on SDR displays. The BL data associated with the VDR encoder 202 may or may not be similar to the BL data associated with the VDR encoder 102 as discussed above.

In an embodiment, the VDR encoder 202, or a base layer SDR encoder (216) therein, is configured to encode the BL data, which may be derived from the SDR signal 208 or from mapping operations on the input VDR image derived from the VDR signal 204, into a base layer bitstream 228.

In an embodiment, media samples represented by the BL data may be predicted either from neighboring samples in the same image (e.g., using intra prediction) or from samples from past decoded images (e.g., using inter prediction) that belong to the same base layer. These samples may be stored or buffered within a reference picture store (for base layer) 214.

In an embodiment, the VDR encoder 202 is configured to perform inter-layer prediction for high bit depth media samples relating to the enhancement layer based on BL data samples. The BL data samples may be retrieved from the reference picture store 214 in one or more of memory buffers or other forms of memory space. In some embodiments, the VDR encoder 202 is designed to perform one or more operations based on an accurate prediction algorithm that uses an inter-layer reference picture and the decoded BL samples to generate no residual values (or, even if generated, residual values are all zeros) for the high bit depth media samples. Thus, high bit depth media samples may be accurately predicted based at least in part on the inter-layer reference picture and the decoded BL samples.

The VDR encoder 202, or a VDR RPU 210 therein, may be configured to generate the coding syntax for generating the EL data (which may comprise inter-layer reference pictures) to be transmitted in an enhancement layer bitstream 224. The coding syntax may comprise a plurality of syntax elements in compliance with the VDR specification supported by the VDR encoder 202 and may include, but are not limited to any of inter-layer prediction coefficients, chroma resampling filter coefficients, color space transform indicators, other VDR syntax elements (e.g., flags and descriptors of functions and/or operations performed by a VDR encoder to generate the BL and EL data, etc.), etc.

In an embodiment, an RPU processing module 212 is configured to perform a series of operations (which may include but are not limited only to those related to prediction) based on the coding syntax. For example, the RPU processing module 212 may perform operations such as inverse tone mapping such as SDR-VDR mapping, chroma upsampling, and one or more video data processing operations (e.g., filtering, interpolation, rescaling, etc.), as specified in the coding syntax. In an embodiment, the RPU processing module 212 generates no residual values (or all residual values are zero because of accurate prediction operations performed by the VDR encoder 202 or the RPU processing module 212 therein). In this embodiment, since enhancement layer VDR encoder 220 is working on pixel data, the RPU processing module 212 does not perform residual non-linear quantization (NLQ) in order to generate the EL data. Accordingly, the coding syntax generated by the VDR RPU 210 may not have parameters related to residual non-linear quantization (NLQ).

In an embodiment, an RPU processing module 212 is configured to generate inter-layer reference pictures based on the coding syntax. An inter-layer reference picture as described herein needs not be generated for every input VDR image; the inter-layer reference picture may be generated for a sequence of one or more contiguous VDR images derived from the VDR signal 204. Media samples from the inter-layer reference pictures may be stored or buffered within a reference picture store (for enhancement layer) 222.

In an embodiment, the VDR encoder 202, or an enhancement layer encoder (220) therein, is configured to encode an output EL signal into an enhancement layer bitstream 224, based at least in part on the inter-layer reference pictures and/or input VDR images derived from the VDR signal 204.

In an embodiment, the VDR encoder 202, or the VDR RPU (210) therein, is configured to encode the coding syntax as at least a part of RPU data into a VDR RPU bitstream 226.

One or both of the base layer encoder (216) and the enhancement layer encoder (220), may be implemented using one or more of a plurality of codecs, such as H.264/MPEG-4 AVC, HEVC, MPEG-2, VP8, VC-1, and/or others.

A corresponding VDR decoder, which implements a reverse data flow to that illustrated in FIG. 2 and supports the same VDR specification with which the VDR encoder 202 generates the coding syntax, may be used to decode bitstreams generated by the VDR encoder 202 of the third version and generate a reconstructed version of the input VDR image.

Additionally, optionally, or alternatively, VDR codecs (or coding systems) corresponding to other versions of VDR specifications may be supported by techniques as described herein.

3. RPU Data Units

Figure 3:
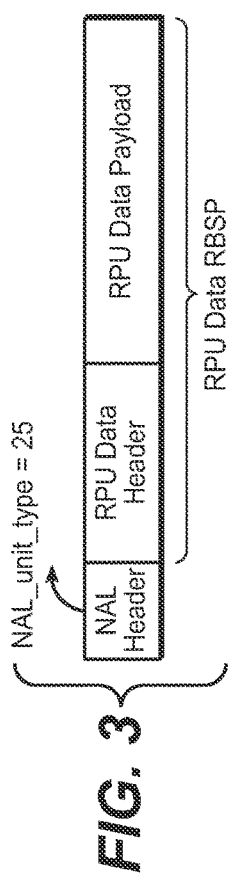
FIG. 3 illustrates a NAL data unit comprises a NAL header and a raw byte sequence payload, in an example embodiment.

In some embodiments, RPU data generated by an upstream device such as a VDR encoder (e.g., 102 of FIG. 1, or 202 of FIG. 2) may be provided to a downstream device in a plurality of network abstraction layer (NAL) data units. In an embodiment, as illustrated in FIG. 3, a NAL data unit comprises a NAL header and a raw byte sequence payload (RBSP). For the purpose of illustration only, when the RBSP in the NAL data unit is used to encapsulate RPU data, a field "NAL_unit_type" in the NAL header may be set to 25 or another identifying number which is different from those NAL types specified in H.264/MPEG-4 AVC specification (IS 14496-10).

In some embodiments, RPU data in the RBSP of a NAL data unit comprises a RPU data header and a RPU data payload. RPU data units may be used as a common vehicle to deliver RPU data from an upstream device to a downstream device, wherein the RPU data may be associated with any one of a plurality of VDR specifications (e.g., different versions). The RPU data header may comprise header fields identifying codecs or coding system types (e.g., for 3D coding systems or for VDR coding systems) and a particular VDR specification among the plurality of different VDR specifications. The RPU data header may also comprise one or more high level (e.g., sequence level and frame level) portions of the RPU data carried in the RPU data unit.

RPU data payloads may be used to transmit, by an upstream device to a downstream device, a descriptor (or syntactic description) of a collection of flags, operations and parameters that may be used for decoding multi-layered video signals and for reconstructing VDR images with the decoded video signals. One or more flags, operations and parameters used for reconstructing the VDR images, as described by the RPU data payloads, may be related to inter-layer prediction. The flags, operations and parameters for inter-layer prediction as described herein may be related to one or more of inverse mapping, chroma upsampling, and other functions such as display management. Additionally, optionally, or alternatively, one or more functions, operations and parameters used for reconstructing the VDR images, as described by the RPU data payloads, may be related to data processing adjunct to, or even other than, inter-layer prediction.

Figure 4:
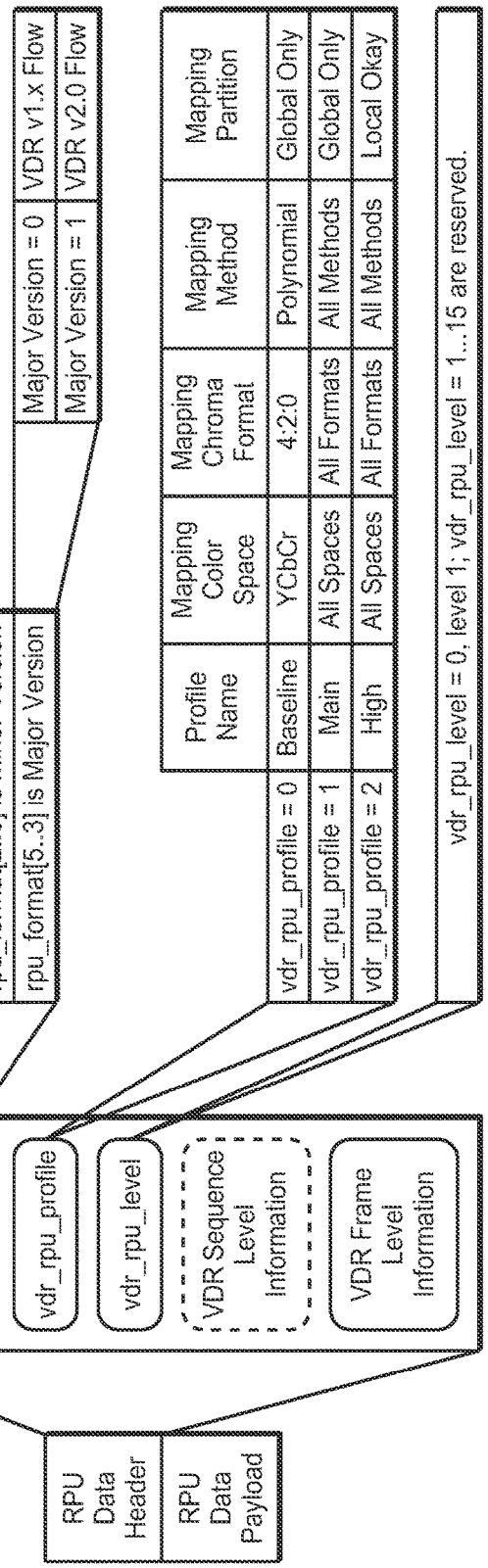
FIG. 4 illustrates a layout of a RPU data header.

FIG. 4 illustrates a layout of a RPU data header, in an example embodiment. In an embodiment, the RPU data header comprises a plurality of header fields. For the purpose of illustration only, the header fields may include, but are not limited to any of, "rpu_type", "rpu_format", "vdr_rpu_profile", "vdr_rpu_level", "vdr sequence level information", "vdr frame level information", etc.

The header field "rpu_type" may be used to identify whether the RPU data is related to 3D codecs (e.g., when rpu_type=0 or 1), or VDR codecs (e.g., when rpu_type=2). The header field "rpu_type" may be used to accommodate additional new video codecs yet to be developed. The header field "rpu_format" may be used to identify one or more VDR versions to which the RPU data is related. For the purpose of illustration only, the most significant bits of the header field "rpu_format" may be used to differentiate VDR codecs of major differences, while the least significant bits of the same field may be used to differentiate minor changes in VDR codecs. For example, when the most significant bits (e.g., top 3) of the header field "rpu_format" is 0, the RPU data is related to a VDR version 1.x flow; on the other hand, when the most significant bits (e.g., top 3) of the header field "rpu_format" is 1, the RPU data is related to a VDR version 2.0 flow.

One or more different RPU profiles may be supported by a VDR coding system as described herein. The header field "vdr_rpu_profile" may be used to identify a profile to which the RPU data pertains. For example, a value 0 of the header field indicates a baseline profile which specifies a mapping color space of YCbCr, a mapping chroma format of 4:2:0, a polynomial mapping method, and a global-only mapping partition; a value 1 of the header field indicates a main profile which specifies all mapping color spaces, all mapping chroma formats, all mapping methods, and a global-only mapping partition; and a value 2 of the header field indicates a high profile which specifies all mapping color spaces, all mapping chroma formats, all mapping methods, and local-okay mapping partitions (global partition or local partitions). In some embodiments, other possible values of the header fields "rpu_profile" are reserved, to be used by new profiles being developed or yet to be developed. The header field "rpu_level" may be additionally and/or optionally used to further differentiate levels of complexity in RPU processing performed with the RPU data.

Under techniques as described herein, a coding syntax, which comprises one or more syntax elements in compliance with a VDR specification, may be transmitted/signaled by a VDR encoder to a VDR decoder in an RPU bitstream. The syntax elements may specify flags, operations, and parameters used in VDR encoding operations and in corresponding VDR decoding operations. The parameters represented in the syntax elements may be of different coefficient types, and may be specified as logical values, integer (fixed point) values, or floating point values, with various precisions, bit lengths, or word lengths, etc.

Some syntax elements in a coding syntax may be classified as sequence level information, which remains unchanged for a full sequence of consecutive images. Examples of sequence level information include, but are not limited to any of syntax elements "chroma_sample_loc_type", "vdr_color_primaries", "vdr_chroma_format_idc", etc., although it should be noted that the same syntax element may be used as sequence level, or a different level in various code syntaxes. As illustrated in FIG. 4, the sequence level information is placed in the header field "vdr sequence level information", which may be a complex field and in turn comprise a flag vdr_seq_info_present_flag to indicate whether any specific sequence level information is directly coded with one or more current RPU data units or whether the sequence level information is to be predicted from previous RPU data.

In some embodiments, for transmission efficiency reasons, the sequence level information may not be sent by a VDR encoder to a VDR decoder for each image (which may be denoted interchangeably as frame in the context of this description). Instead, the sequence level parameters may be sent once for every sequence of contiguous frames. However, embodiments of the present invention do not preclude repeating the sequence level parameters, once, twice, etc., within the same sequence for random access, error correction and robustness reasons. In an example, in a sequence that comprises 100 consecutive images, the sequence level parameters may be repeated within the sequence after a slice of ten frames, 25 frames, 50 frames, etc. In another example, the sequence level parameters may be repeated within the sequence for every instantaneous decoding refresh (IDR) picture, every two IDR pictures, etc.

Some syntax elements in a coding syntax may be classified as frame level information, which remains unchanged for a full frame. In some embodiments, the frame level information is placed in the header field "vdr frame level information," as illustrated in FIG. 4. In some embodiments, some or all of the frame level information may be predicted from frame level syntax elements that were sent in prior RPU data units.

For example, inter-layer prediction coefficients may be the same or similar for a group of pictures (GOP), a scene, a sequence of frames, etc. Therefore, frame level information may not be necessarily repeated for every frame. For one or more current RPU data units that has the same RPU identifier (Id), a VDR encoder may signal to a VDR decoder an RPU ID (or identifier) in a RPU data field "vdr_rpu_id" of the RPU data units to indicate that frame level information is directly coded (which therefore may be retrieved directly with no reference to previous RPU data identified by a different RPU ID) in the current RPU data units.

In some embodiments, a flag "use_prev_vdr_rpu_flag" in one or more current RPU data units may be set to indicate to a VDR decoder that frame level information in one or more previously sent RPU data units should be reused or used for predicting frame level information relating to the one or more current RPU data units. The previously sent RPU data units may be identified in a RPU data field "prev_vdr_rpu_id" in the one or more current RPU data units. Consequently, sending predictable frame level syntax elements in the one or more current RPU data units may be avoided. In some embodiments, assigning an RPU ID to the current RPU data units may also be avoided, since the current RPU data units does not carry directly coded frame level syntax elements. The maximum number of RPU IDs and their corresponding frame level syntax elements may be used for prediction depends on a cost-benefit tradeoff between a reduction of data volume in bitstream transmission and an increase of memory usage at the VDR decoder.

In some embodiments, techniques as described here support dividing an image into one or more partitions. Some syntax elements that may be used to specify a coding syntax may be classified as frame level syntax elements, while some other syntax elements may be classified as partition level syntax elements.

4. RPU Data Decoding—Sequence Level and/or Frame Level

Figure 5A:
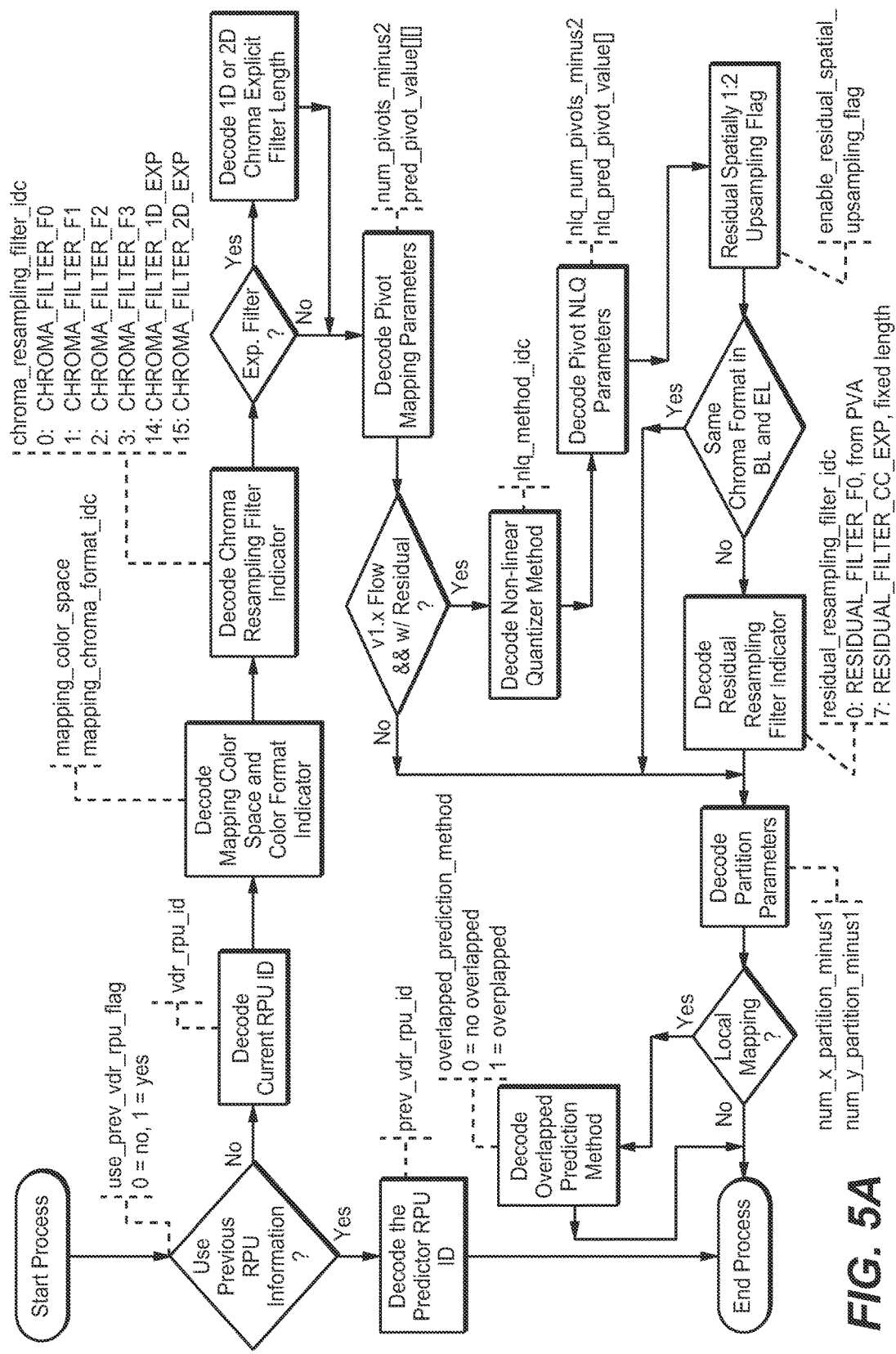
FIG. 5 illustrates RPU data header parsing, in an example embodiment.

FIG. 5 illustrates an RPU decoding (or parsing) process that may be used to decode (or parse) sequence level and/or frame level syntax elements from a RPU data unit. The RPU decoding/parsing process may be configured to receive one or more current RPU data units, and derive at least some of the syntax elements from one or more RPU data headers in the one or more current RPU data unit. Initially, the RPU decoding/parsing process may determine whether a flag "use_prev_vdr_rpu_flag" is present and, if so, what value the flag (syntax element) is.

If it is determined that the flag is set to 1 (or "yes"), the RPU decoding/parsing process proceeds to decode or parse from the received RPU data units a syntax element "prev_vdr_rpu_id", which points to a predictor (or previous) RPU ID associated with previously sent syntax elements in one or more previously sent RPU data units. Based on the predictor RPU ID, the RPU decoding/parsing process may retrieve the previously sent syntax elements from a designated RPU data cache using predictor RPU ID as a key. This processing path with "use_prev_vdr_flag" set to 1 (or "yes") may be used to predict some or all syntax elements of sequence, frame, and partition level in a coding syntax, from previously sent syntax elements of the same levels from the RPU data cache.

On the other hand, if it is determined that the flag "use_prev_vdr_rpu_flag" is 0 (or "no"), the RPU decoding/parsing process proceeds to decode or parse from the received RPU data units a syntax element "vdr_rpu_id", which is set to a current RPU ID assigned to syntax elements directly coded in the one or more current RPU data units. For the purpose of illustration only, these syntax elements may include, but are not limited to: "mapping_color_space", "mapping_chroma_idc", "chroma_resampling_filter_idc", "num_pivots_minus2", "pred_pivot_value[ ][ ]", "nlq_method_idx", "nlq_num_pivots_minus2", "nlq_pred_pivot_value[ ][ ]", "enable_residual_spatial_upsampling_flag", "num_x_partition_minus1", "num_y_partition_minus1", "residual_resampling_filter_idc", "overlapped_prediction_method", etc. It should be noted that, in various embodiments, different syntax elements and/or different names of syntax elements may be defined or used to implement techniques as described herein.

One or more of these syntax elements may be flags that indicate presence or absence of certain corresponding operations. For example, the flag "use_prev_vdr_rpu_flag" indicates presence or absence of an operation to predict RPU data from cached syntax elements for a previous RPU ID. Similarly, a flag "enable_residual_spatial_upsampling_flag" may indicate whether a residual resampling filter operation should be performed in reconstructing a VDR image based on received BL and EL data. An indicator "chroma_resampling_filter_idc" may indicate which chroma resampling filter should be used in reconstructing a VDR image based on received the BL and EL data. In the RPU decoding/parsing process itself, each of these flags is also used to determine whether a particular processing path should be taken.

RPU type and version information (which may indicate, for example, whether the RPU data is associated with a v1.x flow of a corresponding VDR specification and/or whether the VDR specification implements residual-free EL data) may be used to determine some processing paths in the RPU decoding/parsing process as illustrated in FIG. 5.

Parameters, such as syntax elements "num_x_partition_minus1" and "num_y_partition_minus1", may also be used to determine some of the processing paths of the RPU decoding/parsing process. For example, if both of the syntax elements have zero values, which indicate a global-only partition, a processing path corresponding to the global-only partition may be taken. On the other hand, if any or both of these syntax elements have non-zero value(s), then a different processing path may be taken, as illustrated in FIG. 5.

5. RPU Data Decoding—Partition Level

Figure 6:
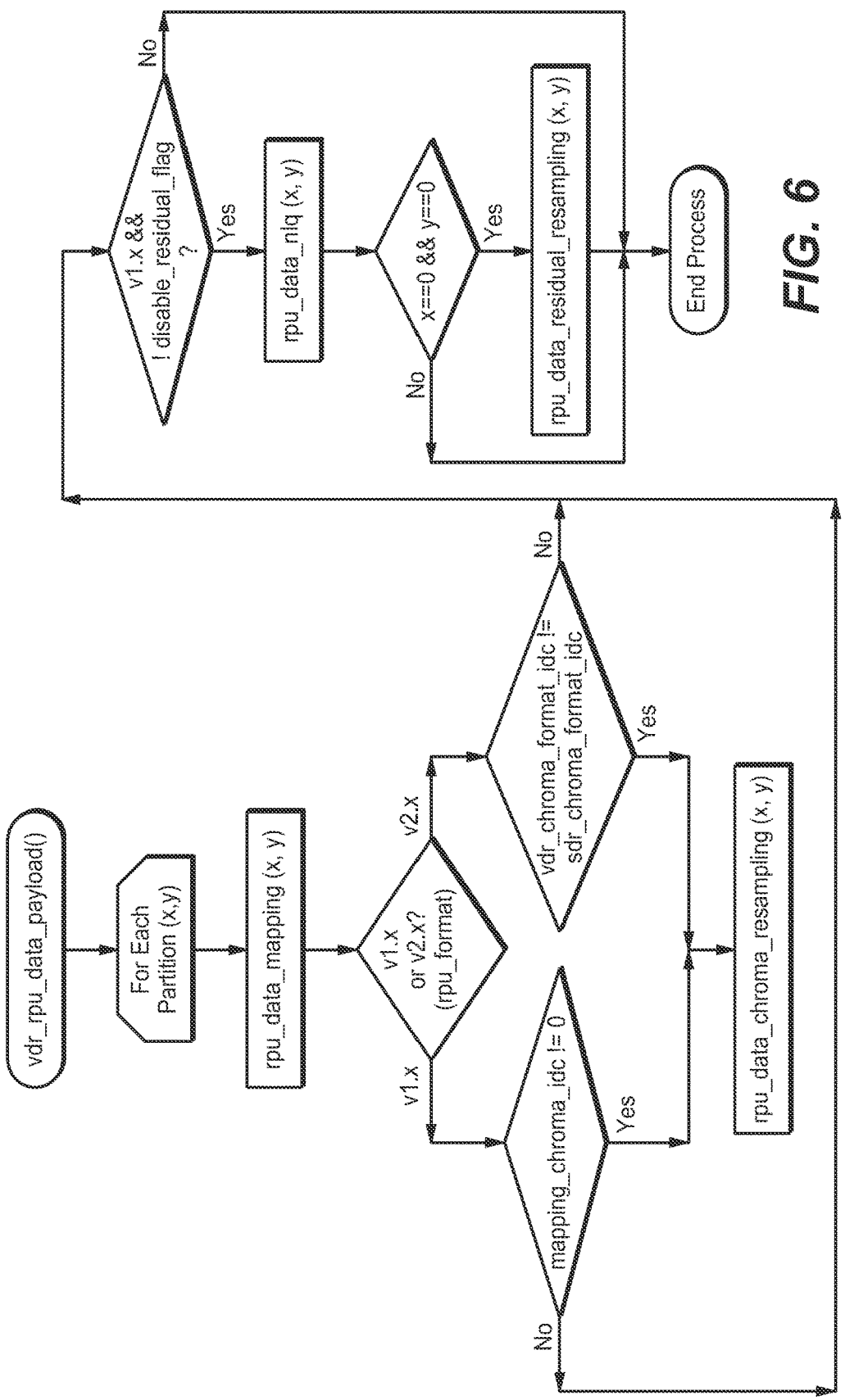
FIG. 6 illustrates a layout of a RPU data payload.

In some embodiments, partition level syntax elements may be transmitted by a VDR encoder to a VDR decoder in (e.g., one or more RPU payloads of) one or more current RPU data units. FIG. 6 illustrates an RPU data payload decoding/parsing process that may be used to decode partition level syntax elements from the one or more current RPU data unit, in an example embodiment. One or more of the partition level syntax elements may relate to, or may be used in a coding syntax to specify inter-layer prediction related operations and/or other processing operations.

In some embodiments, the RPU data payload decoding/parsing process of FIG. 6 may be implemented as a function "vdr_rpu_data_payload ( )", which may be invoked, for example, by the RPU decoding/parsing process of FIG. 5.

In some embodiments, a number of steps of FIG. 6 are repeated for each partition iterating over x and y directions of an image frame. As illustrated in FIG. 6, a function "rpu_data_mapping (x, y)" may be initially called for each partition to decode partition level syntax elements that may be common to a plurality of different VDR specifications. Subsequently, syntax elements more specific to particular VDR specifications may be decoded. Decoding of the more specific syntax elements may be performed based on other syntax elements or RPU information, for example, already decoded from the one or more current RPU data units. For example, based on (1) the "rpu_format" field and (2) syntax element "mapping_chroma_idc" (for VDR specifications of version numbers v1.x) or syntax elements "vdr_chroma_format_idc" and "sdr_chroma_format_idc" (for VDR specifications of version number v2.x) decoded from one or more RPU data headers of the one or more current RPU data units, the RPU data payload decoding/parsing process of FIG. 6 may determine whether chroma resampling operations should be performed on received BL and EL data in compliance with VDR specifications of versions "v1.x" or "v2.x".

If it is determined that the VDR specifications are of versions v1.x and that a flag "disable_residual_flag" is false, a RPU decoding/parsing function "rpu_data_nlq (x, y)" may be called for each partition. Further, other decoding/parsing functions such as a frame level RPU decoding/parsing function "rpu_data_residual_resampling (x, y) may also be invoked when both x and y partition indices are zeros, as illustrated in FIG. 6.

In some embodiments, a VDR specification implemented by a VDR coding system supports chroma resampling, inverse mapping, prediction-based operations including but not limited to: overlapped-region-based prediction, residue non-linear quantization/dequantization, residual chroma resampling, spatial scaling, data processing (e.g., interpolation in border regions of partitions), etc.

For chroma resampling, the VDR specification may support both fixed filter and explicit 1D (2D-separable) filter and 2D (non-separable) filter, or filter using other luma or chroma channel information (cross-channel resampling filter), etc. A syntax element "chroma_resampling_filter_idc" may be used to specify which of the foregoing filters as a part of coding syntax. Under techniques as described herein, different chroma channels may use different filters. Additionally, optionally, or alternatively, an explicit filter may be symmetric or non-symmetric. In some embodiments, one or more filters as described herein are designed to treat picture boundaries (or image boundaries) as a special case in filtering operations. For example, a filter may simply pad a picture boundary by repeating (as illustrated in FIG. 6) or mirroring. In some embodiments, one or more filters as described herein are designed to perform operations across different partitions, or to treat a partition boundary in the same manner as a picture boundary. Different chroma resampling filters may be used for different partitions of the same image. Additionally, optionally, or alternatively, a filter may be applied to all partitions of a full image. Additionally, optionally, or alternatively, a filter of a particular type, e.g., an explicit filter, may be specified for a full image; however, different coefficients may be specified in a coding syntax for different partitions. For example, a syntax element "chroma_resampling_filter_idc" may be signaled at frame level to indicate a particular type of filter is used for the entire frame; however, different filter coefficients for different partitions within the frame may be signaled at partition level. Additionally, optionally, or alternatively, partition level filter coefficients may be directly coded, predicted from one or more of previous partitions under a current RPU ID or predicted from one or more partitions of one or more previous RPU data units under a previous RPU ID. Coefficients as described herein may be non-differentially coded, or differentially coded (e.g., comprising differential values relative to values of different partitions, images, or chroma channels). Chroma resampling filters should also take chroma sample location into consideration.

Figure 8:
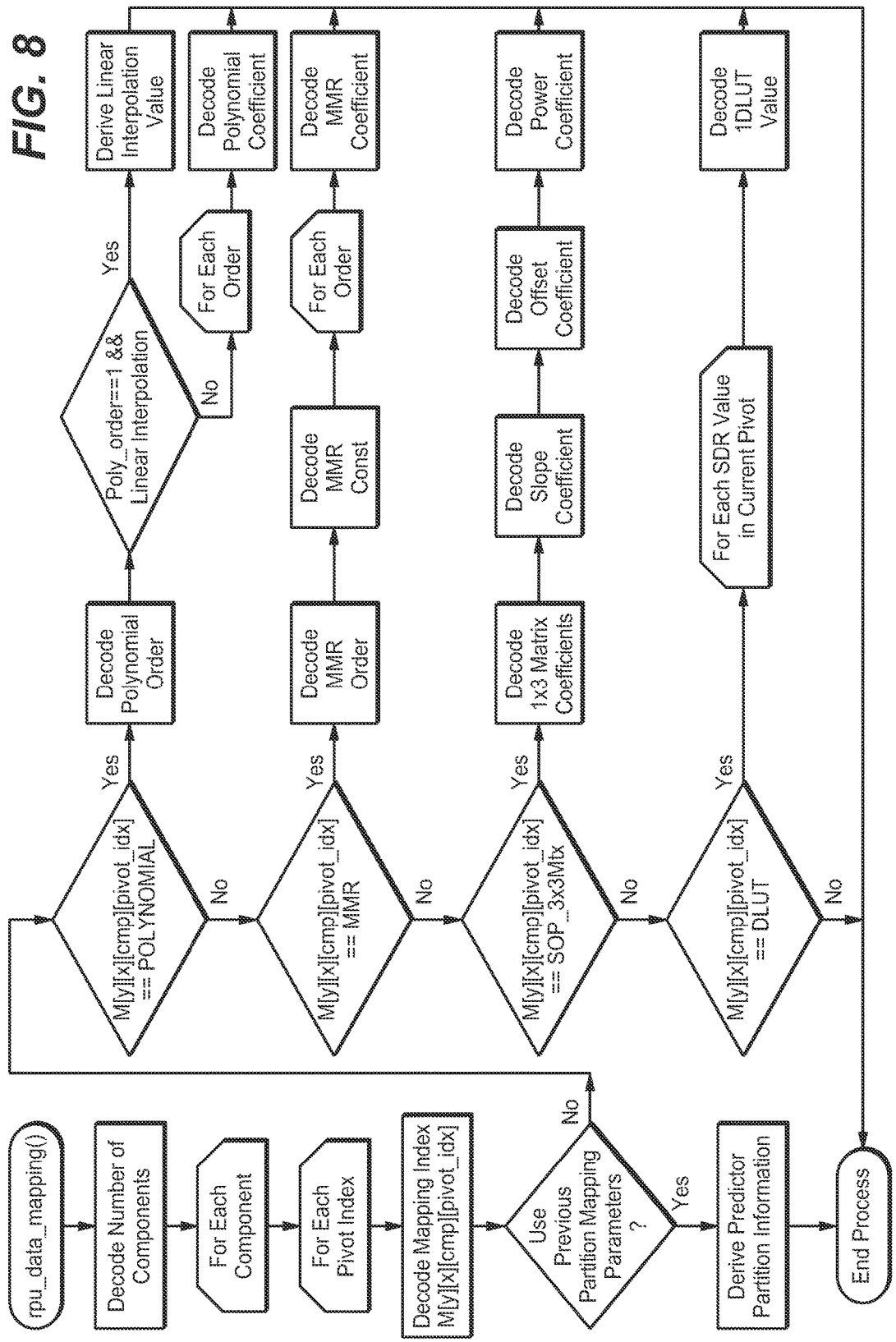

Inverse mapping may play an important role for VDR layered codec. A VDR specification as described herein may support various inverse mapping methods. Examples of inverse mapping methods include, but are not limited only to, any of: bit-shift, polynomial, MMR, SOP, 1D LUT, curve fitting, etc. A decoding/parsing function "rpu_data_mapping ( )" as illustrated in FIG. 8 may be used to decode (or parse) syntax elements related to inverse mapping in each color component (luminance or chroma components) of a designated color space. A syntax element "syntax mapping_idc" may be used to indicate which of the inverse mapping methods is selected. Since different regions of an image may contain different visual content, the VDR specification may allow different partitions (i.e., different regions) to use different mapping methods. The dynamic range of each channel of the image may be divided into different segments (or pieces) and each dynamic range segment may use different mapping method. Further, each dynamic range in each of different partitions may use a different mapping method. This approach may be used in an inverse mapping in which a middle dynamic range of media content in an image is linear and may be handled with linear mapping, while dark and bright ranges are non-linear and should be handled with relatively complicated mapping methods. In one embodiment, syntax pivot_value is used to indicate dynamic range segments. Additionally, optionally, or alternatively, mapped pivot values may be differentially coded (e.g., as indicated by a syntax element "pred_pivot_value") or directly coded in a coding syntax in one or more current RPU data units signaled to a downstream VDR decoder.

In some embodiments, at least one of multiple partitions in an image may use a plurality of different dynamic range segments. In some embodiments, the largest of the numbers of different dynamic range segments in all partitions of an image is determined or set below a limit In some embodiments, all the partitions of an image keep the same number of different dynamic range segments, although dynamic ranges in different partitions may optionally differ.

For linear mapping, one or more syntax elements in a coding syntax may be used by a VDR encoder to signal polynomial coefficients to a downstream VDR decoder. Alternatively, one or more syntax elements in a coding syntax may be used to signal mapped pivot values for interpolating pixels in each dynamic range segment. The presence of the mapped pivot values may be signaled with a syntax element (or a flag) "linear_interp_flag". In an example, some or all values of data points in a 1D LUT may be signaled. In another example, at least some values in a 1D LUT may be built based on interpolation using mapped pivot values signaled to a downstream VDR decoder.

Coefficients used for dynamic range mapping (e.g., tone-mapping) for a partition may be directly coded, or alternatively predicted from mapped dynamic range segments in neighboring partitions derived from the same RPU data unit. Additionally, optionally, or alternatively, coefficients for a partition may be predicted from mapped dynamic range segments in partitions of the mapped pieces derived from a previous RPU data unit. For example, the coefficients for the partition may be predicted from mapped dynamic range segments in the same partition derived from the previous RPU data unit.

Techniques as described herein support using a mapping color space (e.g., as indicated by a syntax element "mapping_color_space") that is different from a coding color space (which may be signaled in sequence level information, for example, in an RPU data header). For example, the coding color space may be YCbCr, while the mapping color space may be RGB. Other types of color spaces may be used as choices for the coding space or mapping space. Mapping color spaces may be different for different partitions. Alternatively, mapping color spaces may be the same for all the partitions. Mapping methods and metadata may be different for different channels of a mapping color space. Alternatively, mapping methods and metadata may be the same for all channels of a mapping color space. In embodiments in which multiple partitions are used in an image, there may exist discontinuity along partition boundaries. In an embodiment, a coding syntax may be used to signal a boundary mapping method that is to be performed by simply smoothing the partition boundaries through weight-based averaging of pixel values or color values and/or through fusing the partition boundary with a linear or nonlinear method. In an embodiment, a syntax element "overlapped_prediction_method" in the coding syntax may be used at least in part to signal the boundary mapping method.

6. RPU Data Decoding—Chroma Mapping

Figure 7:
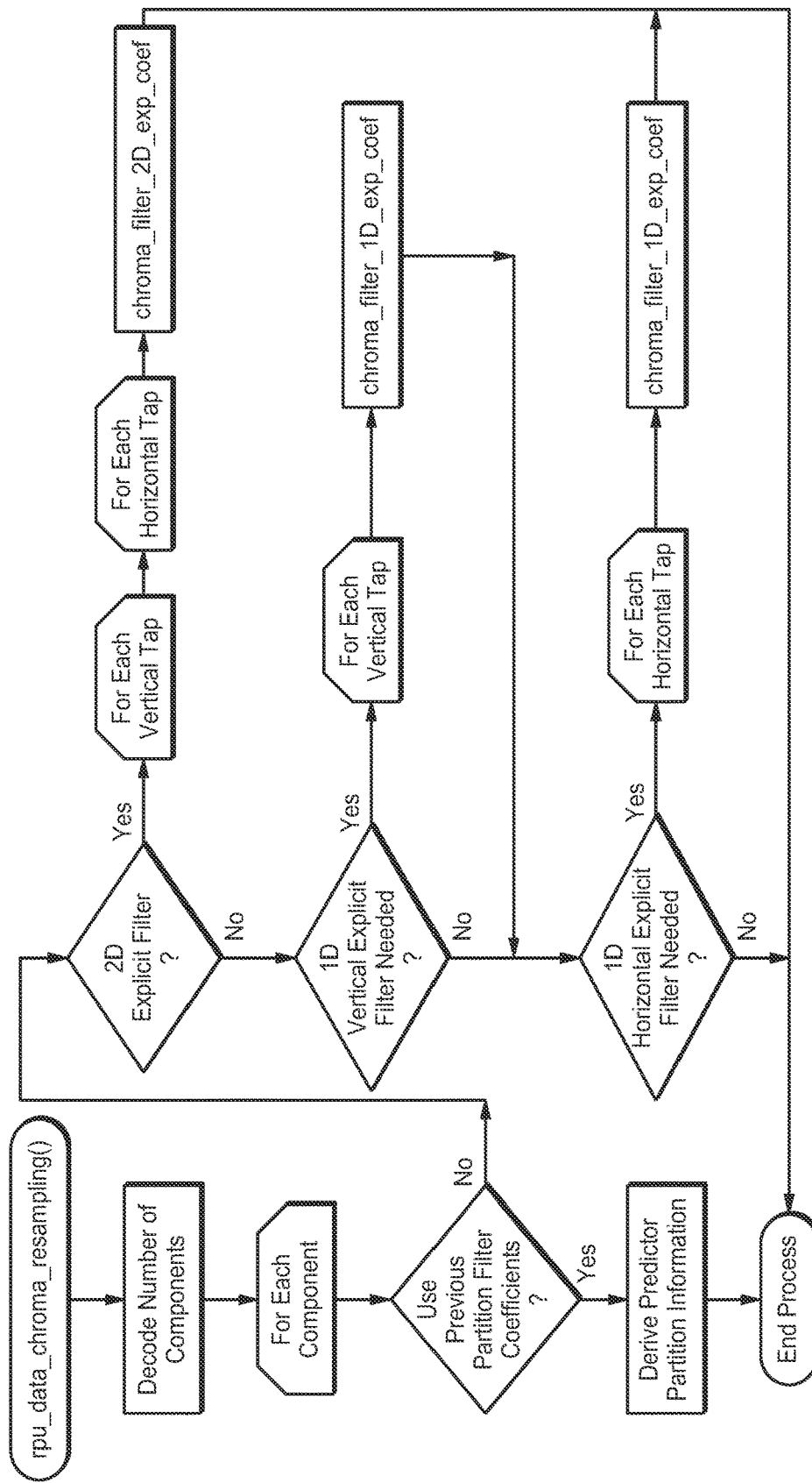
FIG. 7 through FIG. 9 illustrate RPU data payload decoding, in example embodiments.

FIG. 7 illustrates an RPU data decoding (or parsing) operation (e.g., in the form of a rpu_data_chroma_resampling( ) function) that may be used to decode (or parse) syntax elements relating to chroma resampling, in an example embodiment. These syntax elements may, but are not required only to, be at the partition level. The RPU data coding operation may be implemented as a decoding/parsing function, which for example may be invoked by a decoding/ parsing process of FIG. 6. In embodiments in which a mapping color space is the same for a full image, the syntax elements as illustrated in FIG. 7 may optionally be presented in a coding syntax as frame level syntax elements.

In some embodiments, numbers of segments involved in piece-wise mapping operations may be kept the same for all partitions. Some syntax elements relating to interpolation may be presented in a coding syntax as frame level syntax elements, while some other syntax elements relating to the interpolation may be presented in the coding syntax as partition level syntax elements.

As illustrated in FIG. 7, the "rpu_data_chroma_resampling( )" decoding/parting function may decode number of color components in a color space. For each color components, a number of steps may be repeated.

If a flag for a color component indicates using previous partition filter coefficients, then the decoding/parsing function "rpu_data_chroma_resampling( )" proceeds to derive predictor partition information for the color component. The predictor partition information may include the partition filter coefficients derived from cached syntax elements for a previous RPU ID, or alternatively derived from already decoded syntax elements of one or more other partitions from the one or more current RPU data units.

If, on the other hand, the flag for the color component indicates not using previous partition filter coefficients, then the decoding/parsing function "rpu_data_chroma_resampling( )" proceeds to derive the partition filter coefficients from the one or more current RPU data units. These coefficients may be related to 2D explicit filters, 1D vertical explicit filters, 1D horizontal explicit filters, etc.

Like coefficients used in dynamic range mapping, coefficients in chroma resampling or chroma mapping for a partition may be alternatively predicted from like coefficients in neighboring partitions derived from the same one or more current RPU data units. Additionally, optionally, or alternatively, coefficients for a partition may be predicted from like coefficients in partitions of the mapped pieces derived from one or more previously sent RPU data units. For example, the coefficients for the partition may be predicted from like coefficients in the same partition derived from the one or more previously sent RPU data units.

7. Additional Examples of RPU Data Decoding

Figure 9:
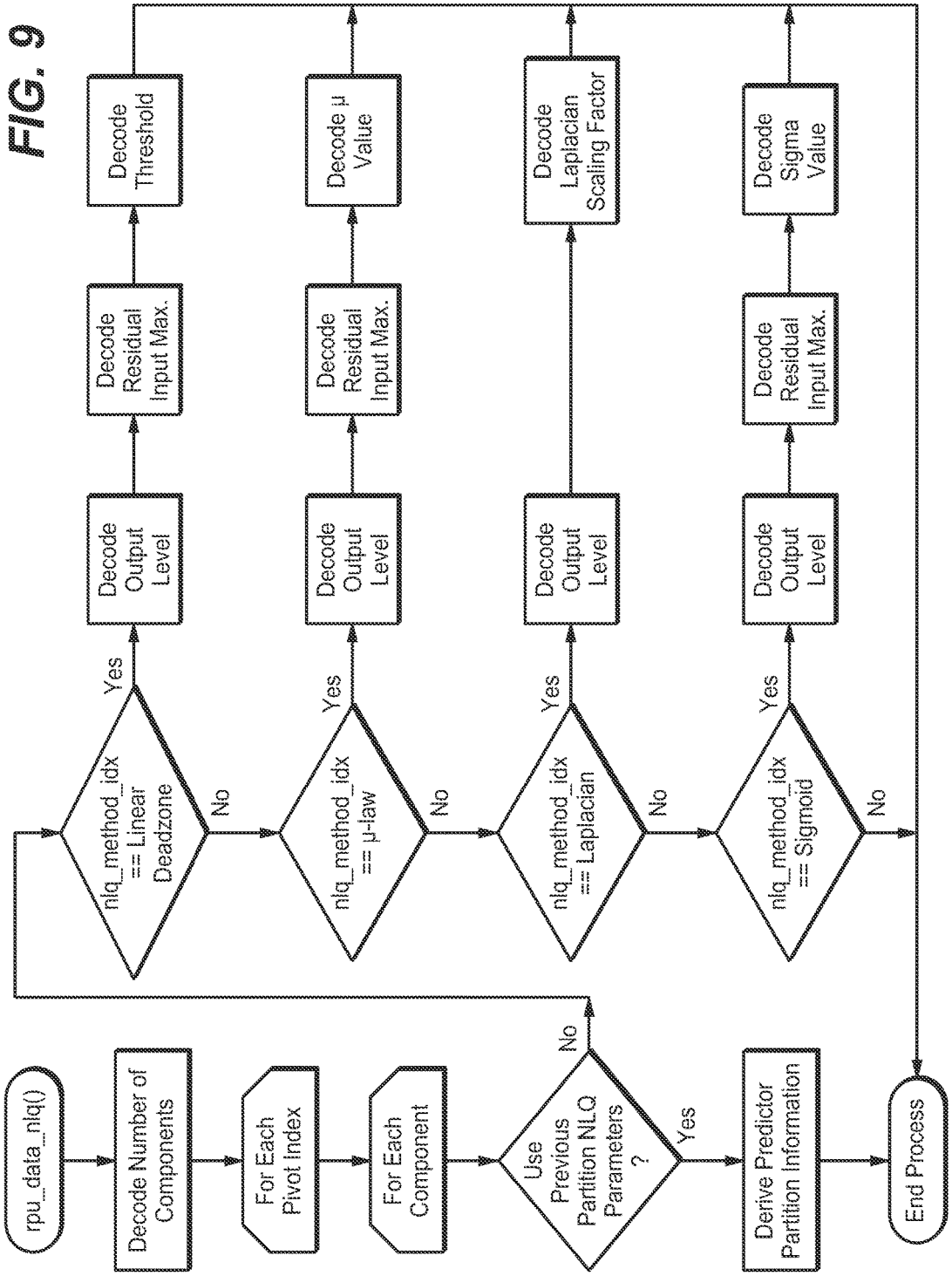

FIG. 9 illustrates an RPU data decoding (or parsing) operation (e.g. in the form of a rpu_data_nlq( ) function) that decodes (or parses) syntax elements relating to non-linear quantization/dequantization in the partition level, in an example embodiment. A specific VDR specification may support non-linear quantization/dequantization. Example of non-linear quantization/dequantization may include, but are not limited only to, any of: those based on linear deadzone, μ-law curve, Laplacian curve, sigmoid curve, etc. A specific method for non-linear quantization/dequantization may be signaled to a downstream VDR decoder in a syntax element "nlq_method_idc". In an embodiment, the same method (e.g., the syntax element "nlq_method_idc" may be signaled as a part of frame level information in an RPU data header) may be used for all partitions of an image; however, coefficients of the method may or may not be the same for different partitions. A data range involved in non-linear quantization/dequantization may be divided into multiple segments; different segments may have different coefficients of the same method.

Like other coefficients used in other operations, coefficients in non-linear quantization/dequantization for a partition may be directly coded, or alternatively predicted from like coefficients in neighboring partitions derived from the same RPU data unit. Additionally, optionally, or alternatively, coefficients for a partition may be predicted from like coefficients in partitions of the mapped pieces derived from a previous RPU data unit. For example, the coefficients for the partition may be predicted from like coefficients in the same partition derived from the previous RPU data unit.

In some embodiments, a coding syntax in compliance with a specific VDR specification may specify chroma resampling and/or spatial upsampling (e.g., 1:2) to be performed on residue data. In some embodiments, operations performed on residual data are handled in a coding syntax in a similar manner to how operations relating to chroma resampling filters as discussed above are handled.

In some embodiments, different chroma formats are used for image data encoded in BL and EL signals. For example, the BL signal may use a different chroma format different chroma sampling and different bit depth than that used by the EL signal. Additionally, optionally, or alternatively, different color spaces may be used by the BL and EL signals.

Techniques as described herein support different processing orders among chroma resampling, color space transform and inverse mapping. In some embodiments, a VDR coding system may support one, two or more of a plurality of possible processing orders. One or more than one processing orders supported by a VDR coding system may be deemed as optimal. For example, coding color spaces for both BL and EL data in output bitstreams (e.g., BL bitstream 228 and EL bitstream 224 of FIG. 2) of a VDR encoder (e.g., 202 of FIG. 2) are YCbCr as specified by a VDR specification; the mapping color space may be RGB; an input SDR signal (e.g., 208 of FIG. 2) is YCbCr 4:2:0; an input VDR signal (e.g., 204 of FIG. 2) is RGB 4:4:4 12 bits. In this example, inter-layer reference data may be generated as follows. The VDR encoder first performs chroma resampling from 4:2:0 to 4:4:4 for BL data derived from the input SDR signal. Next, color transformation may be performed on the BL data (now in the 4:4:4 chroma format) from YCbCr to RGB. Inverse-mapping may be performed on the BL data (now in the 4:4:4 chroma format as well as in the same mapping color space as in the mapping color space) in the mapping color space to generate inter-layer predicted values in the mapping color space. Color transformation may be performed on the inter-layer predicted values from RGB to YCbCr, for the purpose of generating EL data.

8. Example Process Flows

Figure 10:
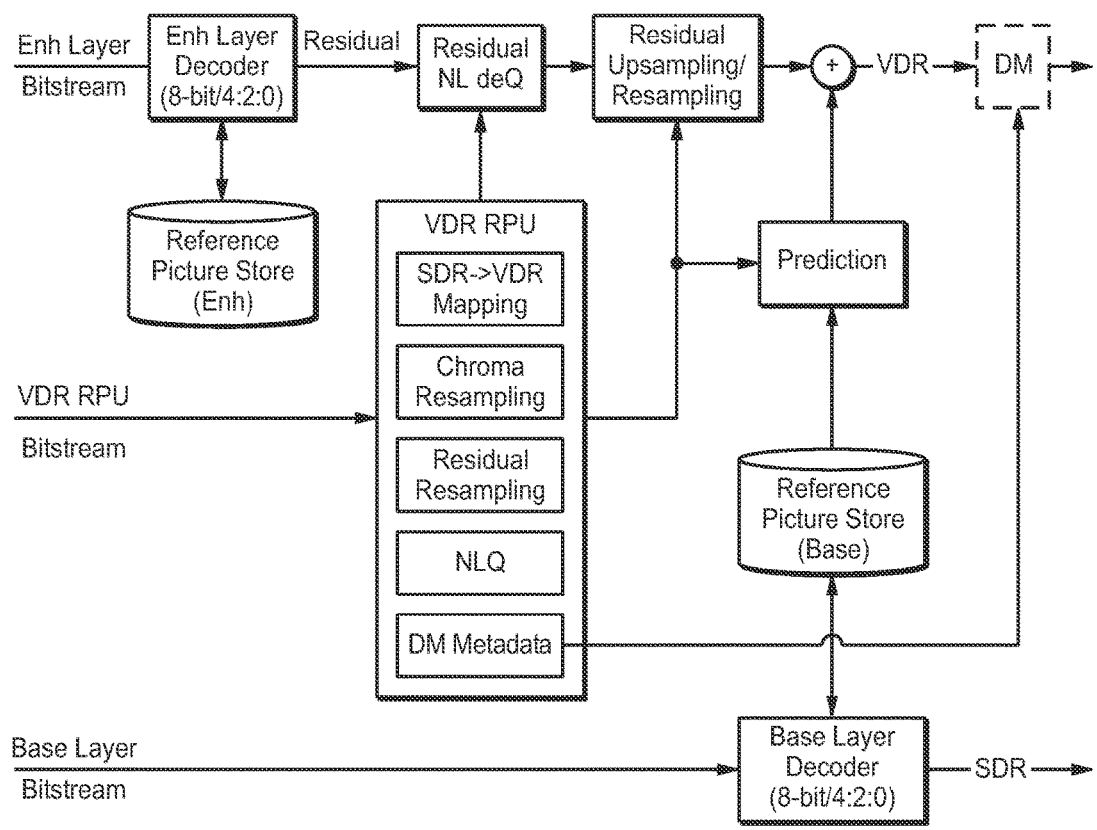
FIG. 10 illustrates a VDR decoder that parses a coding syntax from RPU data, in an example embodiment.

FIG. 10 illustrates a VDR decoder that decodes a coding syntax from RPU data, in an example embodiment. The coding syntax may be in compliance with a specific VDR specification, which may be for example, the first version ("1.0") or the second version ("1.x") supported by the VDR encoder 102 of FIG. 1. The VDR decoder may be configured to perform decoding operations on the BL data, EL data, RPU data, inter-layer prediction data and intermediate media data in accordance with the coding syntax. The VDR decoder of FIG. 10 may be implemented with one or more computing devices, custom and/or off-the shelf hardware devices, programmable devices, any combination of the foregoing, etc.

In some embodiments, the VDR decoder of FIG. 10 may implement one or more of the decoding/parsing processes illustrated in FIG. 5 through FIG. 9 to derive the coding syntax and syntax elements therein. The VDR decoder of FIG. 10 may apply decoding operations to the BL, EL and RPU data to construct an output VDR image that corresponds to an input VDR image encoded, for example, by a VDR encoder (e.g., 102 of FIG. 1).

Figure 11A:
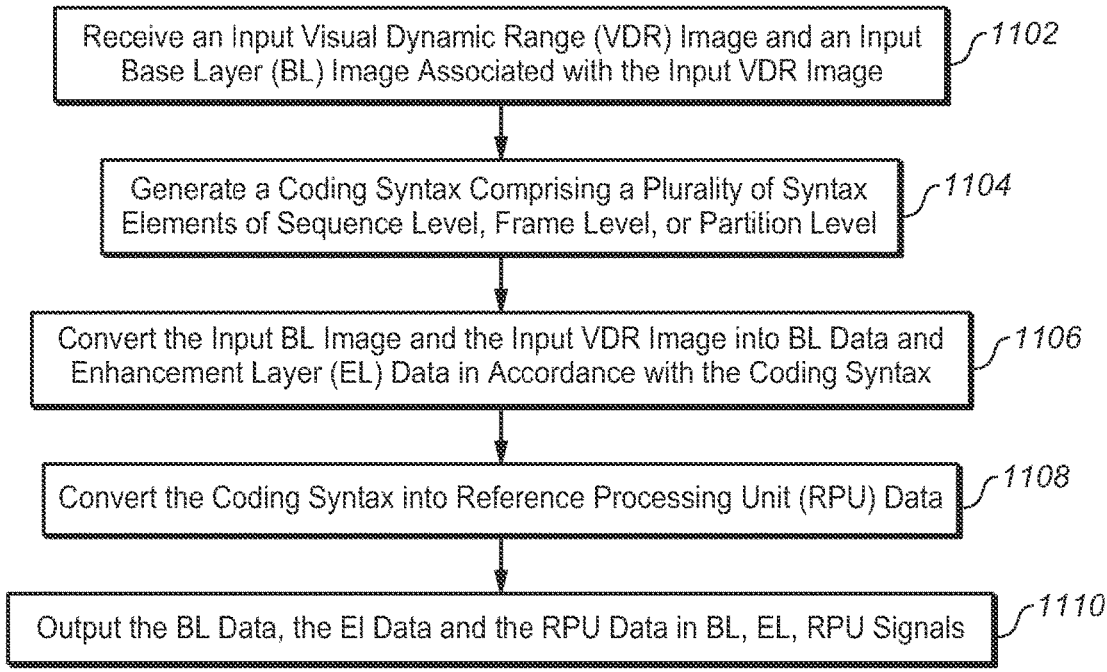
FIG. 11A and FIG. 11B illustrate example process flows, according to example embodiments of the present invention.

FIG. 11A illustrates an example process flow according to an example embodiment of the present invention. In some example embodiments, one or more computing devices or components may perform this process flow. In block 1102, a multi-layer VDR video encoder (e.g., 102 of FIG. 1 or 202 of FIG. 2) receives an input visual dynamic range (VDR) image and an input base layer (BL) image associated with the input VDR image.

In block 1104, the multi-layer VDR video encoder generates a coding syntax comprising a plurality of syntax elements of sequence level, frame level, or partition level.

In block 1106, the multi-layer VDR video encoder converts the input BL image and the input VDR image into BL data and enhancement layer (EL) data in accordance with the coding syntax.

In block 1108, the multi-layer VDR video encoder converts the coding syntax into reference processing unit (RPU) data.

In block 1110, the multi-layer VDR video encoder outputs the BL data, the EL data and the RPU data in BL, EL, RPU signals.

In an embodiment, the multi-layer VDR video encoder is further configured to perform generating, based at least in part on the coding syntax, one or more current RPU data units; and identifying in the one or more current RPU data units a particular VDR specification with which the coding syntax is in compliance.

In an embodiment, at least one of the one or more current RPU data units comprises a data structure capable of supporting any one of a plurality of different VDR specifications.

In an embodiment, the multi-layer VDR video encoder is further configured to perform indicating, in the one or more current RPU data units, at least one syntax element in the plurality of syntax elements in the coding syntax is predictable from one or more other partitions in the one or more current RPU data units.

In an embodiment, the multi-layer VDR video encoder is further configured to perform indicating, in the one or more current RPU data units, at least one syntax element in the plurality of syntax elements in the coding syntax is predictable from one or more previous RPU data units for a previous input VDR image and a previous input BL image associated with the input VDR image.

In an embodiment, the input VDR image and the previous input VDR image belong to a sequence of input VDR images; the sequence of input VDR images shares a common set of syntax elements of sequence level.

In an embodiment, the input VDR image and the previous input VDR image belong to two different sequences of input VDR images; a first sequence in the two different sequences of input VDR images shares a first common set of syntax elements of sequence level; and the second sequence in the two different sequences of input VDR images shares a second different common set of syntax elements of sequence level.

In an embodiment, at least one syntax element in the plurality of syntax elements is usable as a syntax element of two or more of sequence levels, frame levels, or partition levels.

In an embodiment, the BL data represents a standard dynamic range (SDR) image optimized for viewing on SDR displays. In an embodiment, the BL data does not represent a standard dynamic range (SDR) image optimized for viewing on SDR displays.

In an embodiment, the EL data comprises residual values between the input VDR image and a predicted VDR image generated based on the BL data. In an embodiment, the EL data comprises an inter-layer reference picture for two or more input VDR images in a sequence of input VDR images; the two or more input VDR images include the input VDR image.

In an embodiment, the plurality of syntax elements includes one or more of parameters, coefficients, pivot values, flags indicating presence or absence of operations corresponding to the flags, or one or more types of metadata including display management metadata.

In an embodiment, the input VDR image comprises image data encoded in an input color space; the EL data comprise image data encoded in an output color space; the EL data is generated based at least in part on mapped data; the mapped data is generated based at least in part on the BL data; and the mapped data comprises mapped image data encoded in a mapped color space.

In an embodiment, at least two of the input color space, the output color space, and the mapped color space are different. In an embodiment, at least two of the input color space, the output color space, and the mapped color space are same.

In an embodiment, the EL data comprise image data encoded in a first chroma format; the BL data comprises image data encoded in a second different chroma forma. In an embodiment, the EL data comprise image data encoded in a chroma format; the BL data comprises image data encoded in the same chroma forma.

In an embodiment, the plurality of syntax elements signals one or more of chroma resampling operations, inverse mapping operations, non-overlapped-region-based prediction operations, overlapped-region-based prediction operations, residue non-linear quantization and dequantization operations, residual chroma resampling operations, spatial scaling operations, data processing operations including interpolations, or display management operations.

In an embodiment, the multi-layer VDR video encoder is further configured to perform converting one or more input VDR images represented, received, transmitted, or stored with one or more input video signals into one or more output VDR images represented, received, transmitted, or stored with one or more output video signals.

In an embodiment, the input VDR image comprises image data encoded in one of: a high dynamic range (HDR) image format, a RGB color space associated with the Academy Color Encoding Specification (ACES) standard of the Academy of Motion Picture Arts and Sciences (AMPAS), a P3 color space standard of the Digital Cinema Initiative, a Reference Input Medium Metric/Reference Output Medium Metric (RIMM/ROMM) standard, an sRGB color space, a RGB color space, or a YCbCr color space.

Figure 11B:
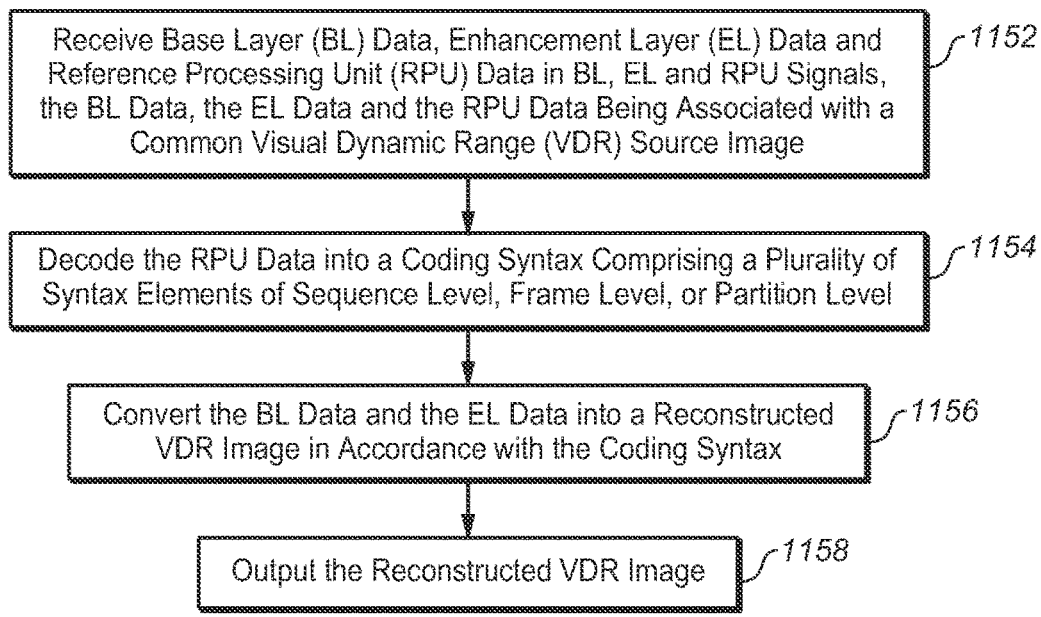

FIG. 11B illustrates an example process flow according to an example embodiment of the present invention. In some example embodiments, one or more computing devices or hardware components may perform this process flow. In block 1152, a multi-layer video decoder (e.g., as illustrated in FIG. 10) receives base layer (BL) data, enhancement layer (EL) data and reference processing unit (RPU) data in BL, EL and RPU signals, the BL data, the EL data and the RPU data being associated with a common visual dynamic range (VDR) source image.

In block 1154, the multi-layer video decoder decodes the RPU data into a coding syntax comprising a plurality of syntax elements of sequence level, frame level, or partition level.

In block 1156, the multi-layer video decoder converts the BL data and the EL data into a reconstructed VDR image in accordance with the coding syntax.

In block 1158, the multi-layer video decoder outputs the reconstructed VDR image.

In an embodiment, the multi-layer video decoder is further configured to perform determining, from one or more current RPU data units, a particular VDR specification with which the coding syntax is in compliance; and deriving at least a portion of the coding syntax from the one or more current RPU data units.

In an embodiment, the multi-layer video decoder is further configured to perform determining, from the one or more current RPU data units, at least one syntax element in the plurality of syntax elements in the coding syntax is predictable from one or more other partitions in the one or more current RPU data units.

In an embodiment, the multi-layer video decoder is further configured to perform determining, from the one or more current RPU data units, at least one syntax element in the plurality of syntax elements in the coding syntax is predictable from one or more previous RPU data units in connection with a previously reconstructed VDR image.

In an embodiment, the reconstructed VDR image and the previously reconstructed VDR image belong to a sequence of reconstructed VDR images; the sequence of reconstructed VDR images shares a common set of syntax elements of sequence level.

In an embodiment, the reconstructed VDR image and the previously reconstructed VDR image belong to two different sequences of reconstructed VDR images; a first sequence in the two different sequences of reconstructed VDR images shares a first common set of syntax elements of sequence level; and the second sequence in the two different sequences of reconstructed VDR images shares a second different common set of syntax elements of sequence level.

In an embodiment, the EL data comprises an inter-layer reference picture for two or more reconstructed VDR images in a sequence of reconstructed VDR images, and the two or more reconstructed VDR images include the reconstructed VDR image.

In an embodiment, the reconstructed VDR image comprises image data encoded in a first color space; the EL data comprise image data encoded in a second color space; the reconstructed VDR image is generated based at least in part on the mapped data derived from the BL data; and the mapped data comprises mapped image data encoded in a third color space.

In an embodiment, at least two of the first, second and third color spaces are different. In an embodiment, at least two of the first, second and third color spaces are same.

In an embodiment, the multi-layer video decoder is further configured to perform converting image data represented, received, transmitted, or stored with one or more input video signals into one or more output VDR images represented, received, transmitted, or stored with one or more output video signals.

In an embodiment, the reconstructed VDR image comprises image data encoded in one of: a high dynamic range (HDR) image format, a RGB color space associated with the Academy Color Encoding Specification (ACES) standard of the Academy of Motion Picture Arts and Sciences (AMPAS), a P3 color space standard of the Digital Cinema Initiative, a Reference Input Medium Metric/Reference Output Medium Metric (RIMM/ROMM) standard, an sRGB color space, a RGB color space, or a YCbCr color space.

In various example embodiments, an encoder, a decoder, a system, an apparatus, or one or more other computing devices performs any or a part of the foregoing methods as described.

9. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
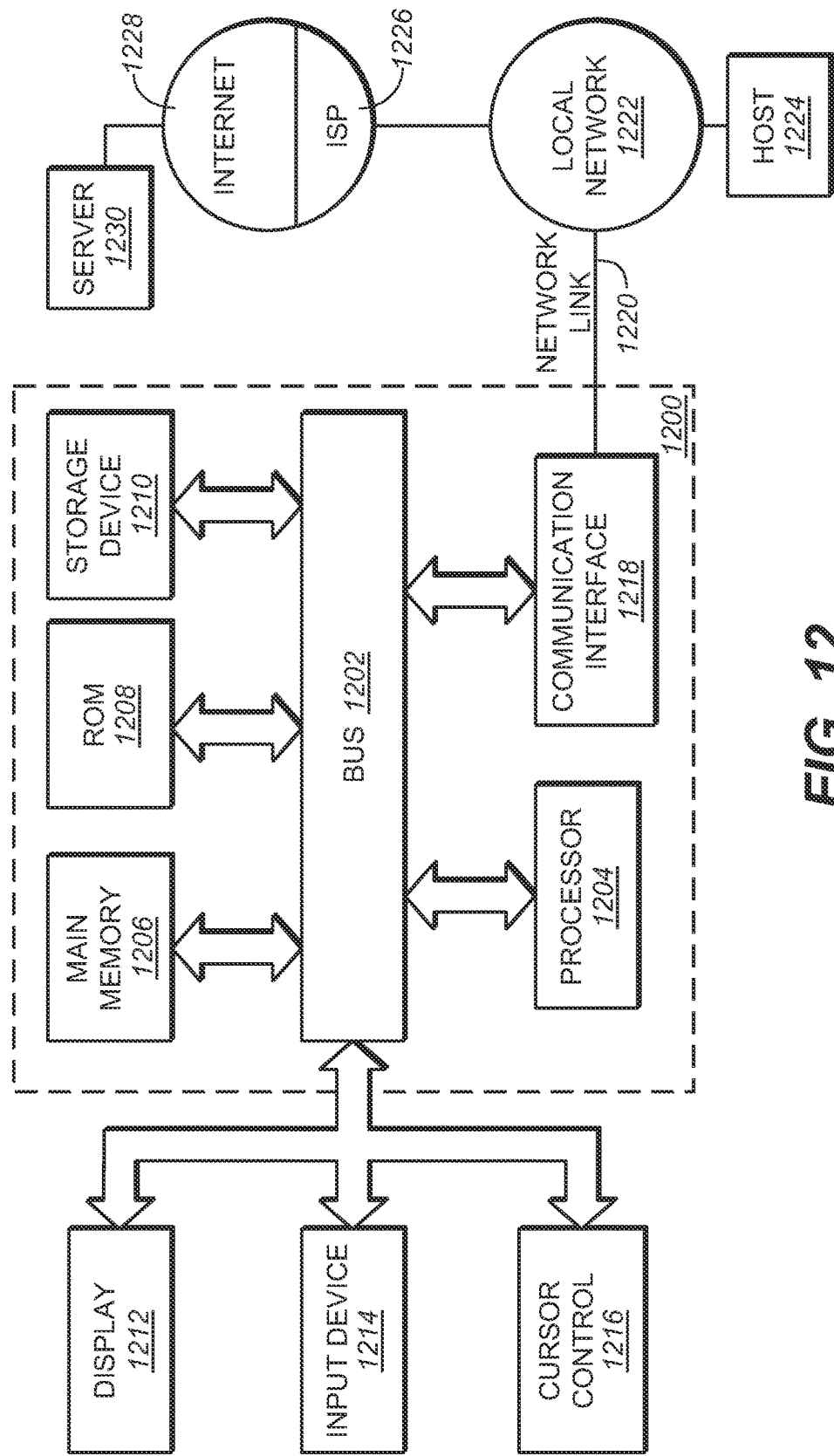
FIG. 12 illustrates an example hardware platform on which a computer or a computing device as described herein may be implemented, according an embodiment of the present invention.

For example, FIG. 12 is a block diagram that illustrates a computer system 1200 upon which an example embodiment of the invention may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a liquid crystal display, for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

10. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:

receiving an input visual dynamic range (VDR) image and an input base layer (BL) image associated with the input VDR image;

generating a coding syntax for encoding-related operations comprising a plurality of syntax elements, wherein the coding syntax specifies a set of operations performed by an upstream encoder to generate BL data and enhancement layer (EL) data;

converting the input BL image and the input VDR image into the BL data and the EL data in accordance with the coding syntax by performing the set of operations as specified in the coding syntax; wherein the EL data comprises residual values between the input VDR image and a predicted VDR image generated based on the BL data; wherein the plurality of syntax elements specifies one or more of: chroma resampling operations, inverse mapping operations, non-overlapped-region-based prediction operations, overlapped-region-based prediction operations, residue non-linear quantization and dequantization operations, residual chroma resampling operations, residual spatial upsampling operations, data processing operations including interpolations, which are performed to generate the BL and EL data;
wherein the plurality of syntax elements comprises syntax elements for inverse mapping operations that include a plurality of pivot indices dividing an output dynamic range into different dynamic range segments of respectively different brightness levels;
encoding the plurality of syntax elements in the coding syntax into reference processing unit (RPU) data to enable a downstream decoder to use the same coding syntax for decoding-related operations; wherein the RPU data comprises a current RPU data unit; and
outputting the BL data, the EL data and the RPU data in BL, EL and RPU signals; wherein the current RPU data unit comprises a flag indicative of whether frame level syntax elements of previously sent RPU data should be reused.

2. The method as recited in claim 1, wherein the current RPU data unit comprises a data structure capable of supporting any one of a plurality of different VDR versions, and further indicating, in the current RPU data unit, at least one syntax element in the plurality of syntax elements in the coding syntax as being predictable from one or more other partitions in the current RPU data unit.

3. The method as recited in claim 1, further comprising indicating, in the current RPU data unit, at least one syntax element in the plurality of syntax elements in the coding syntax as being predictable from one or more previous RPU data units for a previous input VDR image and a previous input BL image associated with the previous input VDR image.

4. The method as recited in claim 3, wherein the input VDR image and the previous input VDR image belong to two different sequences of input VDR images; wherein a first sequence in the two different sequences of input VDR images shares a first common set of syntax elements of sequence level; and wherein the second sequence in the two different sequences of input VDR images shares a second different common set of syntax elements of sequence level.

5. The method as recited in claim 1, wherein at least one syntax element in the plurality of syntax elements is usable as a syntax element of two or more of sequence level(s), frame level(s), or partition level(s).

6. The method as recited in claim 1, wherein the EL data comprises an inter-layer reference picture for two or more input VDR images in a sequence of input VDR images, and wherein the two or more input VDR images include the input VDR image.

7. The method as recited in claim 1, wherein the plurality of syntax elements includes one or more of parameters, coefficients, pivot values, flags indicating presence or absence of operations corresponding to the flags, or one or more types of metadata including display management metadata.

8. A method, comprising:
receiving base layer (BL) data, enhancement layer (EL) data and reference processing unit (RPU) data in BL, EL and RPU signals, the BL data, the EL data and the RPU data being associated with a common visual dynamic range (VDR) source image; wherein the EL data comprises residual values between the VDR source image and a predicted VDR image generated based on the BL data;
decoding the RPU data into a coding syntax comprising a plurality of syntax elements; wherein the plurality of syntax elements specifies one or more of: chroma resampling operations, inverse mapping operations, non-overlapped-region-based prediction operations, overlapped-region-based prediction operations, residue non-linear quantization and dequantization operations, residual chroma resampling operations, residual spatial upsampling operations, data processing operations including interpolations, which are performed by an upstream encoder to generate the BL and EL data;
wherein the plurality of syntax elements comprises syntax elements for inverse mapping operations that include a plurality of pivot indices dividing an output dynamic range into different dynamic range segments of respectively different brightness levels;
wherein the coding syntax specifies a set of operations performed by an upstream encoder to generate the BL data and the EL data;
converting the BL data and the EL data into a reconstructed VDR image in accordance with the coding syntax by performing the set of operations as specified in the coding syntax; wherein the RPU data comprises a current RPU data unit; wherein the current RPU data unit comprises a flag indicative of whether frame level syntax elements of previously sent RPU data should be reused; and
outputting the reconstructed VDR image.

9. The method as recited in claim 8, further comprising:
determining, from the current RPU data unit, the particular VDR version with which the coding syntax is in compliance; wherein the particular VDR version provides a specification of syntax elements that may be included in the coding syntax; and
deriving at least a portion of the syntax elements from the current RPU data unit.

10. The method as recited in claim 8, further comprising determining, from the current RPU data unit, at least one syntax element in the plurality of syntax elements in the coding syntax as predictable from one or more other partitions in the current RPU data unit.

11. The method as recited in claim 8, further comprising determining, from the current RPU data unit, at least one syntax element in the plurality of syntax elements in the coding syntax as predictable from one or more previous RPU data units in connection with a previously reconstructed VDR image.

12. The method as recited in claim 11, wherein the reconstructed VDR image and the previously reconstructed VDR image belong to a sequence of reconstructed VDR images, and wherein the sequence of reconstructed VDR images shares a common set of syntax elements of sequence level.

13. The method as recited in claim 11, wherein the reconstructed VDR image and the previously reconstructed VDR image belong to two different sequences of reconstructed VDR images; wherein a first sequence in the two different sequences of reconstructed VDR images shares a first common set of syntax elements of sequence level; and wherein the second sequence in the two different sequences of reconstructed VDR images shares a second different common set of syntax elements of sequence level.

14. The method as recited in claim 8, wherein at least one syntax element in the plurality of syntax elements is usable as a syntax element of two or more of sequence level, frame level, or partition level.

15. The method as recited in claim 8, wherein the EL data comprises an inter-layer reference picture for two or more reconstructed VDR images in a sequence of reconstructed VDR images, and wherein the two or more reconstructed VDR images include the reconstructed VDR image.

16. The method as recited in claim 8, wherein the plurality of syntax elements includes one or more of: parameters, coefficients, pivot values, flags indicating presence or absence of operations corresponding to the flags, or one or more types of metadata including display management metadata.

17. The method as recited in claim 8, wherein the reconstructed VDR image comprises image data encoded in a first color space, wherein the EL data comprises image data encoded in a second color space, wherein the reconstructed VDR image is generated based at least in part on the mapped data derived from the BL data, and wherein the mapped data comprises mapped image data encoded in a third color space.

18. The method as recited in claim 8, further comprising converting image data represented, received, transmitted, or stored with one or more input video signals into one or more output VDR images represented, received, transmitted, or stored with one or more output video signals.

19. A non-transitory computer readable medium, storing software instructions, which when executed by one or more processors cause performance of the steps of the method as recited in claim 1.

20. A non-transitory computer readable medium, storing software instructions, which when executed by one or more processors cause performance of the steps of the method as recited in claim 8.

21. The method as recited in claim 1, wherein the input BL image has been color corrected within a standard dynamic range.

22. The method as recited in claim 8, wherein the BL data comprises a BL image that has been color corrected within a standard dynamic range.

23. The method as recited in claim 1, wherein the plurality of syntax elements includes a syntax element that indicates a particular type of chroma resampling filter from a plurality of different types of chroma resampling filters to be used for an entire frame; wherein the plurality of different types of chroma resampling filters comprises an explicit one-dimensional filter, an explicit two-dimensional filter, an explicit symmetrical filter and/or an explicit non-symmetrical filter.

24. The method as recited in claim 8, wherein the plurality of syntax elements includes a syntax element that indicates a particular type of chroma resampling filter from a plurality of different types of chroma resampling filters to be used for an entire frame; wherein the plurality of different types of chroma resampling filters comprises an explicit one-dimensional filter, an explicit two-dimensional filter, an explicit symmetrical filter and/or an explicit non-symmetrical filter.

* * * * *